United States Patent
Yamada et al.

[11] Patent Number: 5,867,216
[45] Date of Patent: Feb. 2, 1999

[54] IMAGE SENSING APPARATUS

[75] Inventors: Kunihiko Yamada, Tokyo; Masahide Hirasawa, Kanagawa-ken, both of Japan

[73] Assignee: Canon Kabushiki Kaisha, Tokyo, Japan

[21] Appl. No.: 432,982

[22] Filed: May 2, 1995

Related U.S. Application Data

[63] Continuation of Ser. No. 18,700, Feb. 17, 1993, abandoned.

[30] Foreign Application Priority Data

Feb. 21, 1992 [JP] Japan .................................. 4-034848
Jun. 26, 1992 [JP] Japan .................................. 4-192985

[51] Int. Cl.$^6$ .................................................. H04N 5/232
[52] U.S. Cl. ............................................ 348/347; 348/349
[58] Field of Search ..................................... 348/345, 347, 348/349, 360, 361, 362, 363, 364; 354/400, 402, 404, 270, 274, 272; 396/91, 92, 93, 104, 111; H04N 5/232

[56] References Cited

U.S. PATENT DOCUMENTS 5,055,665  10/1991  Baba et al. .......................... 250/201.7
5,164,756  11/1992  Hirasawa .
5,212,516  5/1993   Yamada .
5,223,981  6/1993   Kaneda .
5,293,542  3/1994   Ise et al. .

FOREIGN PATENT DOCUMENTS 1252945  9/1989  Japan .............................. G03B 9/02

*Primary Examiner*—Thai Tran
*Assistant Examiner*—Tuan V. Ho
*Attorney, Agent, or Firm*—Robin, Blecker, Daley and Driscoll

[57] ABSTRACT

An image sensing apparatus includes a diaphragm for an image sensing optical system, the aperture of the diaphragm being formed in a shape which is substantially asymmetrical in a horizontal or vertical direction, a in-focus detecting circuit for making a decision as to near focus state, in focus and far focus on the basis of a signal waveform which corresponds to an edge portion of a subject image passed through the diaphragm, and a driving circuit for performing focus adjustment of the image sensing optical system on the basis of an output of the in-focus detecting circuit.

14 Claims, 16 Drawing Sheets

FIG.5(a)
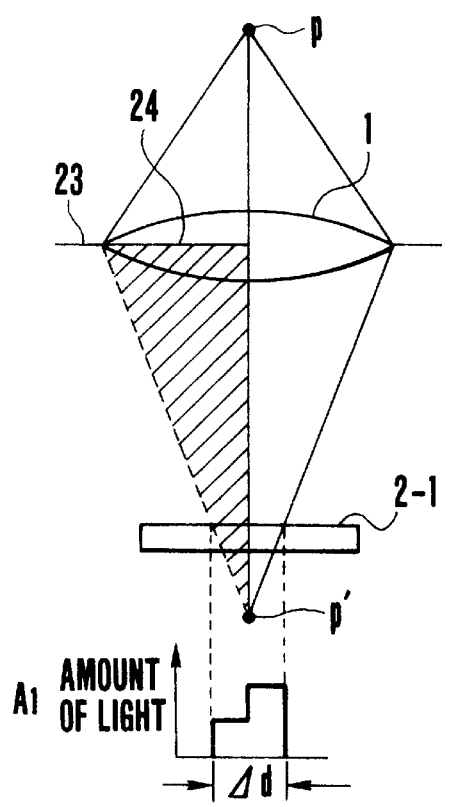
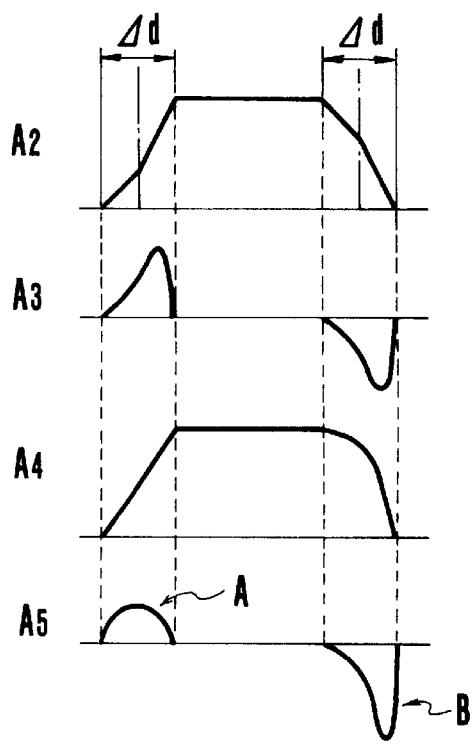
FIG.5(b)
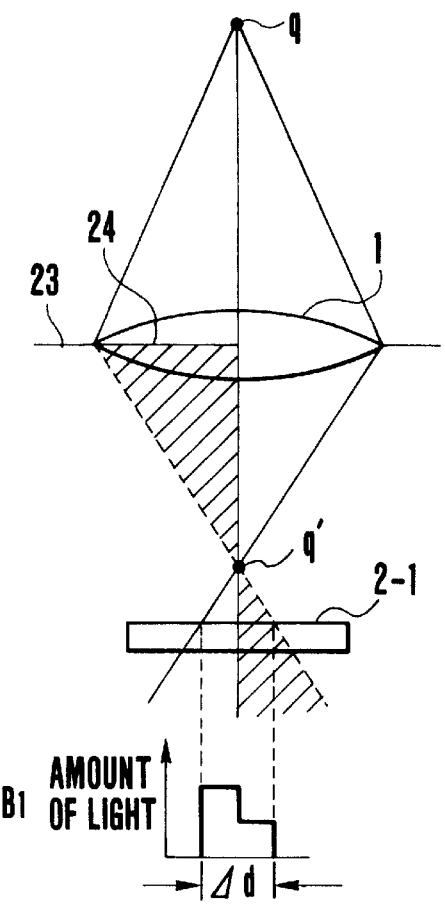
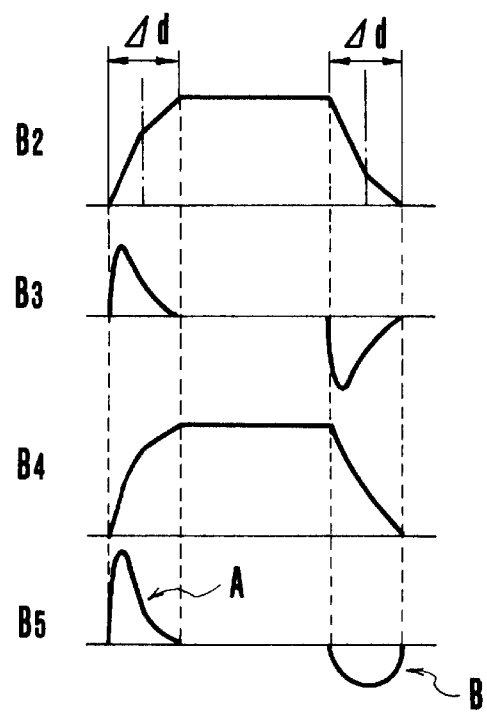

FIG.6
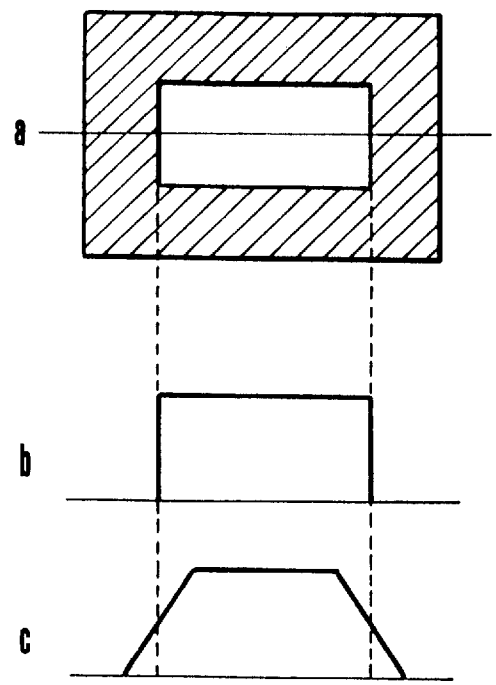
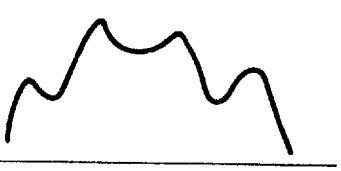
FIG. 7A
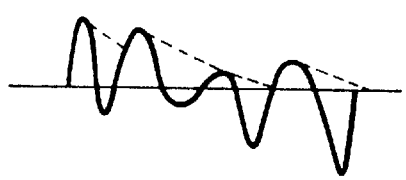
FIG. 7B
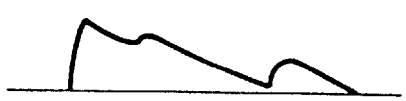
FIG. 7C

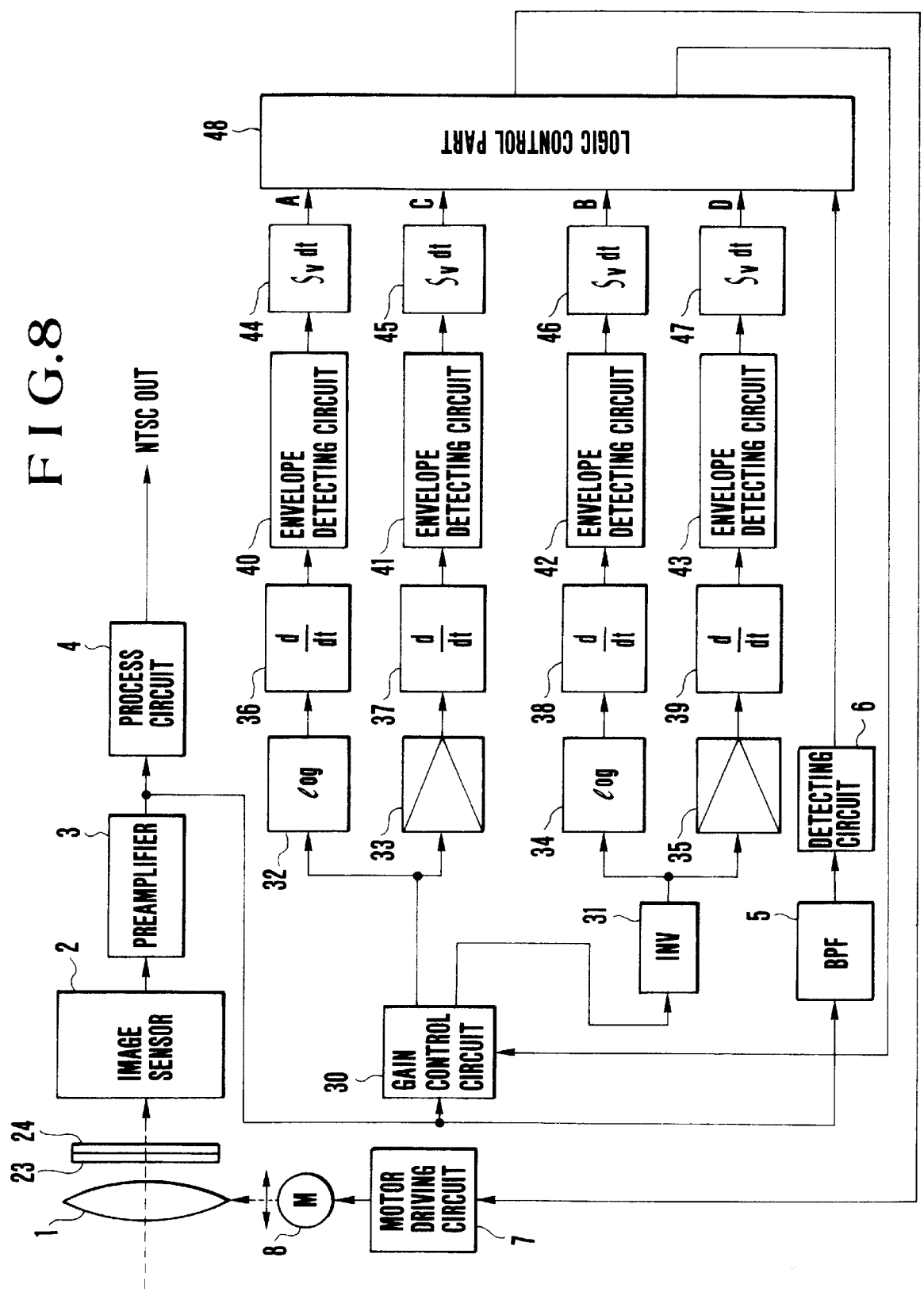

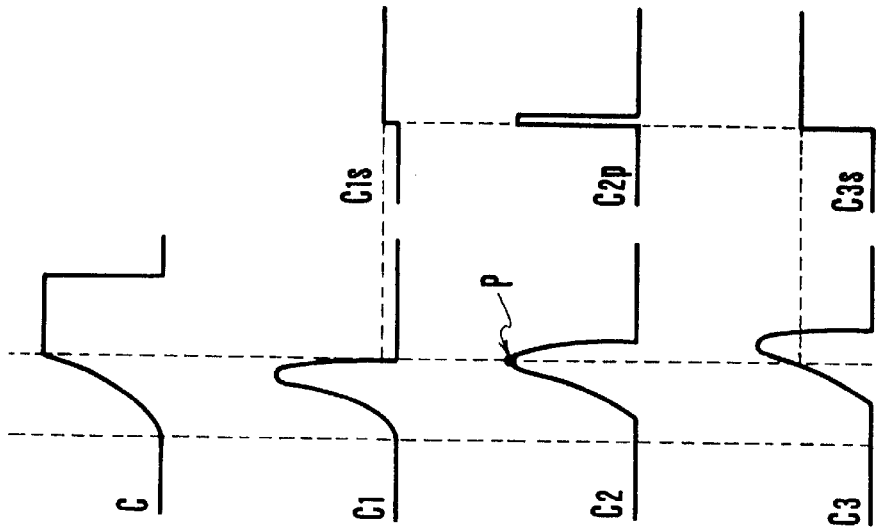
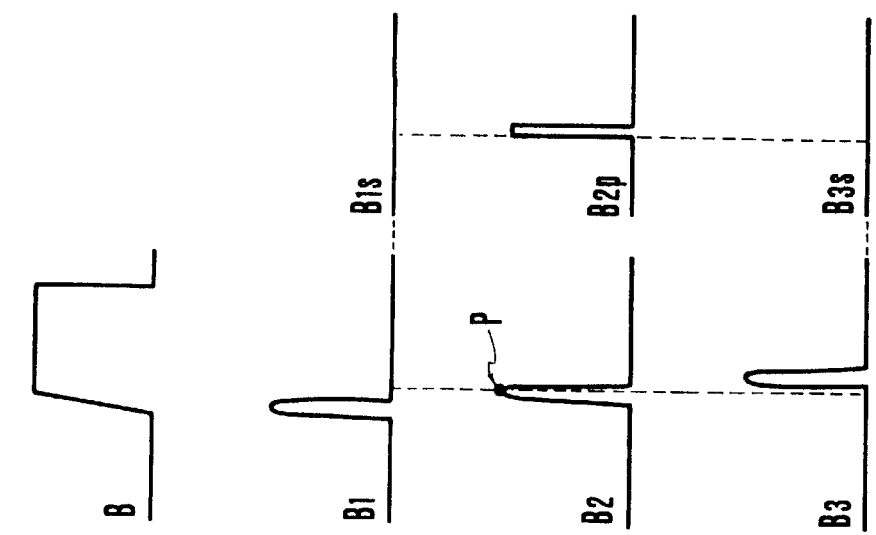
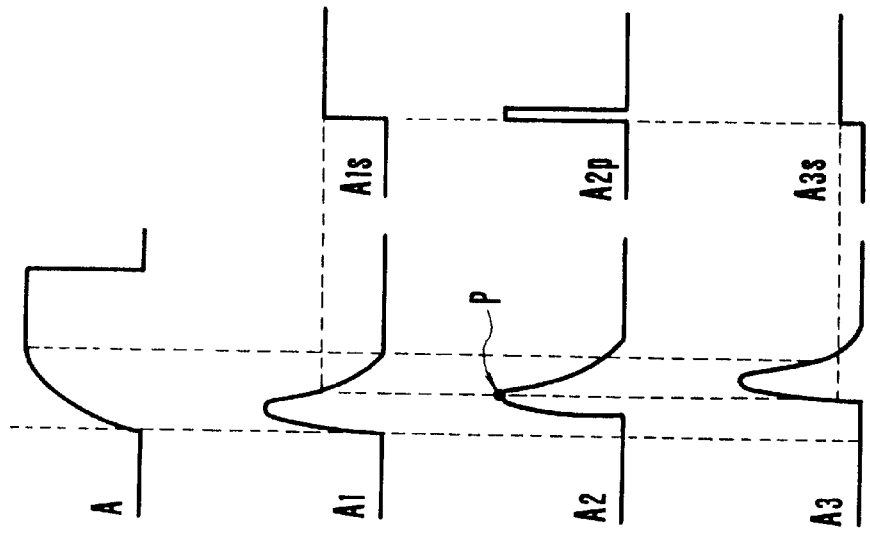

F I G.20
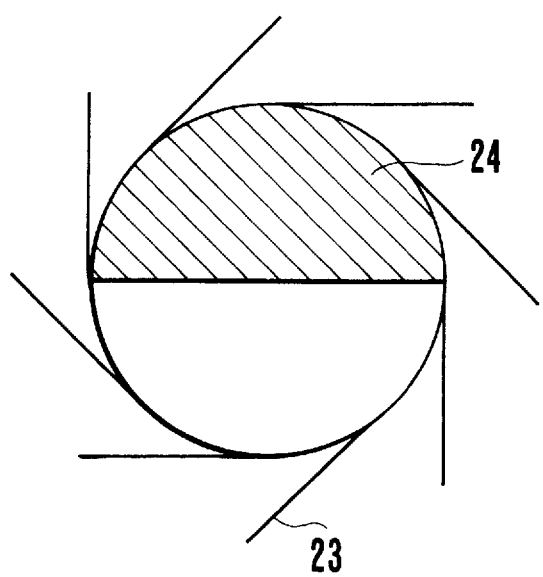

IMAGE SENSING APPARATUS

This is a continuation application under 37 CFR 1.62 of prior application Ser. No. 08/018,700, filed Feb. 17, 1993 now abandoned.

BACKGROUND OF THE INVENTION

1. Field of the Invention

The present invention relates to an image sensing apparatus which carries out focus adjustment by driving an image sensing optical system by using a video signal obtained from an image sensor.

2. Description of the Related Art

In the field of this kind of apparatus, a system has heretofore been known which is arranged to extract a high-frequency component contained in a video signal by means of a band-pass filter or the like or extract the sharpness of an edge portion of the subject image by a video-signal differentiating process or the like, make a decision as to the state of a subject image on the image sensing plane of an image sensor, and attain an in-focus state by moving the position of a lens so that the extracted amount reaches a maximum. This system is described in detail in "Automatic Focus Adjustment of Television Camera by Hill Climbing Servo System" written by Ishida, et al. ("NHK Technical Research", 1965, Vol. 17, No. 1). Such system will be described in brief below with reference to FIGS. 1 and 2.

The example shown in FIG. 1 includes an image sensing lens 1 which constitutes one element of an image sensing optical system, an image sensor 2, a preamplifier 3, a process circuit 4, a band-pass filter (hereinafter called "BPF") 5, a detecting circuit 6, a motor driving circuit 7 and a motor 8.

A subject image, which is formed on an image sensing plane (focal plane) of the image sensor 2, is converted into an electrical signal by the image sensor 2, and the electrical signal is obtained as a video signal from the image sensor 2. The video signal is amplified to a suitable level by the preamplifier 3, and the output of the preamplifier 3 is converted into a standardized video signal, such as an NTSC television signal, by the process circuit 4. The output of the preamplifier 3 is also applied to the BPF 5, in which a high-frequency component contained in the video signal is extracted. The detecting circuit 6 provides an output equivalent to the absolute amount of the high-frequency component.

As shown in FIG. 2, the output of the detecting circuit 6 varies depending on the amount by which the image sensing lens 1 is moved forward or backward, and shows its maximum at a certain position. The reason for this is as follows. As the amount of movement of the image sensing lens 1 varies, the state of focus of the image projected on the image sensing plane of the image sensor 2 varies accordingly. In the case of an in-focus state, i.e., the state in which the projected image is in focus, the sharpness of the projected image reaches its maximum, and if the projected image of maximum sharpness is converted into a video signal by the image sensor 2, then the video signal contains the maximum absolute amount of high-frequency component.

The motor driving circuit 7 controls the direction of rotation of the motor 8 so that the image sensing lens 1 moves in the direction in which the output of the detecting circuit 6 becomes larger, and stops the motor 8 at a position where the output of the detecting circuit 6 reaches its maximum.

In the above-described manner, the amount of movement of the image sensing lens 1 of the image sensing apparatus is controlled to automatically attain the in-focus state.

In the above-described system, if it is assumed that the image sensing lens 1 is initially located at the position indicated by a point A of FIG. 2, it is necessary to temporarily move the image sensing lens 1 in the direction of an infinity end or a closest-distance end and determine the direction of driving of the image sensing lens 1, for the purpose of moving the image sensing lens 1 to a point B which is an in-focus position. For example, if the image sensing lens 1 is driven at the point A of FIG. 2 in the direction of the infinity end, it is only necessary to continue driving the image sensing lens 1 until the image sensing lens 1 reaches the point B. However, if the image sensing lens 1 is driven at the point A in the direction of the closest-distance end, it is necessary to reverse the driving direction of the image sensing lens 1 after it is confirmed that the output of the detecting circuit 6 has lowered.

Even if the image sensing lens 1 is being driven in the direction of the point B, since it is impossible to determine, upon arrival of the image sensing lens 1 at the point B, whether the output of the detecting circuit 6 obtained at the point B is the maximum, it is necessary to perform the operation of causing the image sensing lens 1 to pass the point B, confirming a lowering in the output of the detecting circuit 6 at a point C and returning the image sensing lens 1 to the point B.

The above-described operation must be neccessarily performed because if no variation of the output of the detecting circuit 6 is confirmed while driving the image sensing lens 1, it is impossible to determine whether the subject image is in focus, out of focus with an image point of the subject image being deviated in the direction of an infinity end (hereinafter referred to as "far focus"), or out of focus with the image point of the subject image being deviated in the direction of a closest-distance end (hereinafter referred to as "near focus"). For this reason, the above-described operation is not suitable for the purpose of attaining an in-focus state automatically, efficiently and smoothly.

To overcome the disadvantages of the above-described system, a system is proposed which is arranged to make a decision as to the state of focus of a subject image in an image sensing plane by periodically vibrating part of a lens system or an image sensor along the optical axis by a small degree at specific intervals, thereby automatically attaining an in-focus state. Such a system is described in detail, for example, in Japanese Laid-Open Patent Application No. Sho 58-188965 (Kitamura, et al.). According to this system, since it is possible to determine whether the state of focus is in focus, near focus or far focus without driving the lens system, it is possible to effect a focusin operation efficiently and smoothly as compared with the previously-described system.

However, the latter conventional example requires a complicated and expensive mechanism for vibrating the lens system or the image sensor along the optical axis. Further, if the state of focus is deviated from an in-focus state to an excessive extent, a large magnitude of vibration must be produced with the result that a subject image is unnaturally photographed as if it were vibrating in itself.

SUMMARY OF THE INVENTION

It is, therefore, an object of the present invention which has been made to solve the above-described problems to provide an image sensing apparatus capable of smoothly attaining an in-focus state by means of a simple mechanism.

Another object of the present invention is to provide an image sensing apparatus capable of making a decision as to near focus and far focus without moving a focusing lens, an image sensor or the like.

Another object of the present invention is to provide an automatic focus adjustment apparatus having an extremely simple mechanism and an extremely high accuracy.

To achieve the above-described objects, according to one aspect of the present invention, there is provided an image sensing apparatus for converting a subject image formed by an image sensing optical system into a video signal by means of an image sensor, which apparatus comprises diaphragm means provided for use with the image sensing optical system, the diaphragm means having an aperture of a shape which is substantially asymmetrical in a horizontal or vertical direction, focus decision means for making a decision as to a near-focus state, a far-focus state and an in-focus state of the image sensing optical system on the basis of a waveform of the video signal which corresponds to an edge of the subject image, and driving means for driving the image sensing optical system in a direction in which the image sensing optical system is brought into focus, on the basis of an output of the focus decision means.

According to another aspect of the present invention, there is provided an image sensing apparatus wherein the focus decision means includes a gain control circuit for receiving the video signal obtained from the image sensor and outputting first and second output signals which are gain-controlled by a control signal so that their gains differ from each other, a first amplifier for nonlinearly amplifying the first output signal of the gain control circuit, a second amplifier for amplifying the first output signal of the gain control circuit linearly or nonlinearly according to a nonlinear characteristic different from a nonlinear characteristic of the first amplifier, a third amplifier for nonlinearly amplifying the second output signal of the gain control circuit, a fourth amplifier for amplifying the second output signal of the gain control circuit linearly or nonlinearly according to a nonlinear characteristic different from a nonlinear characteristic of the third amplifier, control signal generating means for detecting a waveform component of a rising edge of the video signal from an output signal of the second amplifier and also a waveform component of a falling edge of the video signal from an output signal of the fourth amplifier, generating the control signal so that both the waveform components become equal, and supplying the control signal to the gain control circuit, and decision means for detecting a waveform component of a rising edge of the video signal from an output signal of the first amplifier and also a waveform component of a falling edge of the video signal from an output signal of the third amplifier, comparing the waveform components with each other, and making a decision as to a near-focus state, a far-focus state and an in-focus state.

According to another aspect of the present invention, there is provided an image sensing apparatus wherein the focus decision means includes a gain control circuit for receiving the video signal obtained from the image sensor and outputting first and second output signals which are gain-controlled by a control signal so that their gains differ from each other, a first selecting switch for selecting and outputting one signal from the first and second output signals of the gain control circuit in synchronism with a scanning of the video signal, a first amplifier for nonlinearly amplifying the output of the first selecting switch, a second amplifier for amplifying the output of the first selecting switch linearly or nonlinearly according to a nonlinear characteristic different from a nonlinear characteristic of the first amplifier, a second selecting switch for selecting and outputting one signal from an output signal of the first amplifier and an output signal of the second amplifier in synchronism with the scanning of the video signal, control signal generating means for detecting a waveform component of a rising edge of the video signal from the output signal of the second amplifier when the first selecting switch selects the first output signal of the gain control circuit and the second selecting switch selects the output signal of the second amplifier, and also detecting a waveform component of a falling edge of the video signal from the output signal of the second amplifier when the first selecting switch selects the second output signal of the gain control circuit and the second selecting switch selects the output signal of the second amplifier, generating the control signal so that both the waveform components become equal, and supplying the control signal to the gain control circuit, and decision means for detecting a waveform component of a rising edge of the video signal from the output signal of the first amplifier when the first selecting switch selects the first output signal of the gain control circuit and the second selecting switch selects the output signal of the first amplifier, and also detecting a waveform component of a falling edge of the video signal from the output signal of the first amplifier when the first selecting switch selects the second output signal of the gain control circuit and the second selecting switch selects the output signal of the first amplifier, comparing the waveform components with each other, and making a decision as to a near-focus state, a far-focus state and an in-focus state.

According to the above-described aspects, a decision as to near focus, far focus and in focus is made on the basis of the waveform of a video signal which corresponds to an edge of a subject image if the subject image is out of focus.

Another object of the present invention is to provide a focus detecting apparatus of wide dynamic range which is capable of achieving highly accurate focus detection even in the case of a subject of low illuminance and low contrast.

Another object of the present invention is to provide a focus detecting apparatus capable of effecting in-focus detection even in the case of a subject which contains either one only of a rising-edge component and a falling-edge component within a picture or within a specific area which is suitably set in the picture for the purpose of in-focus detection, for example, even in the case of a subject which contains only a rising-edge component within the picture, such as a so-called black-and-white edge which has only white on the right half of the picture and only black on the left half of the picture.

Another object of the present invention is to provide an in-focus detecting apparatus capable of detecting the near- and far-focus states of an optical system at an improved detection accuracy and in which it is not necessary to incorporate an integrating circuit having a very wide dynamic range.

To achieve the above objects, according to another aspect of the present invention, there is provided a focus detecting apparatus in which a diaphragm provided for use with an optical system has an aperture of a horizontally or vertically asymmetrical shape and which is arranged to obtain a video signal waveform by converting a subject image projected by the optical system into an electrical signal by means of an image sensor and extract a variation component of the video signal waveform provided by the asymmetrical shape of the aperture of the diaphragm from the obtained video signal waveform, thereby detecting whether the subject image is in focus, out of focus with an image point of the subject image being deviated in the direction of a closest-distance end, or out of focus with the image point of the subject image being deviated in the direction of an infinity end. The focus detecting apparatus comprises a differentiating circuit for obtaining a differential waveform of the video signal waveform, a first delay circuit for delaying by a specific time the differential waveform outputted from the differentiating circuit and providing a delayed output, a second delay circuit for further delaying the delayed output of the first delay circuit and providing a delayed output, a peak holding circuit for obtaining a maximum value of the delayed output of the first delay circuit, a first sample-and-hold circuit for holding the differential waveform outputted from the differentiating circuit at the same timing as the peak holding circuit, and a second sample-and-hold circuit for holding the delayed output of the second delay circuit at the same timing as the peak holding circuit, wherein a decision as to the state of focus of the optical system is made by comparing an output of the first sample-and-hold circuit and an output of the second sample-and-hold circuit.

According to another aspect of the present invention, there is provided an image sensing apparatus in which a diaphragm provided for use with an optical system has an aperture of a horizontally or vertically asymmetrical shape and which is arranged to obtain a video signal waveform by converting a subject image projected by the optical system into an electrical signal by means of an image sensor and extract a variation component of the video signal waveform provided by the asymmetrical shape of the aperture of the diaphragm from the obtained video signal waveform, thereby detecting whether the subject image is in focus, out of focus with an image point of the subject image being deviated in the direction of a closest-distance end, or out of focus with the image point of the subject image being deviated in the direction of an infinity end. The image sensing apparatus comprises a first envelope detecting circuit for obtaining a first envelope component relative to a rising-edge component of the video signal waveform which is nonlinearly amplified, a second envelope detecting circuit for obtaining a second envelope component relative to a falling-edge component of the video signal waveform which is nonlinearly amplified, the second envelope component being of opposite polarity to the first envelope component, a third envelope detecting circuit for obtaining a third envelope component relative to a rising-edge component of a video signal waveform which is amplified linearly or nonlinearly according to a nonlinear characteristic of the nonlinearly amplified video signal waveform, and a fourth envelope detecting circuit for obtaining a fourth envelope component relative to a falling-edge component of the video signal waveform which is amplified linearly or nonlinearly according to the nonlinear characteristic of the nonlinearly amplified video signal waveform, the fourth envelope component being of opposite polarity to the third envelope component, wherein a result obtained by adding together outputs of the respective first and second envelope detecting circuits and a result obtained by adding together outputs of the respective third and fourth envelope detecting circuits are respectively integrated within a predetermined area provided in one picture to obtain individual integral values, thereby making a decision, on the basis of the integral values, as to whether the subject image is in focus, out of focus with an image point of the subject image being deviated in the direction of a closest-distance end, or out of focus with the image point of the subject image being deviated in the direction of an infinity end.

According to the above-described aspects, the values of differential waveforms before and after the instant when the maximum value of the differential waveform of a video signal is obtained are compared with each other to perform in-focus detection. Accordingly, it is possible to ensure a comparatively high detection accuracy even in the case of a subject of low illuminance and low contrast. Further, even in the case of a subject containing only a rising-edge component or a falling-edge component, it is possible to effect in-focus detection with an accuracy similar to the accuracy of in-focus detection of a general subject.

Further, in a signal processing for processing the rising- and falling-edge components of a video signal waveform, a positive envelope detection output and a negative envelope detection output are respectively obtained from the rising- and falling-edge components, and the two outputs are integrated while being added together. Thus, an integral value by integration for one field period is outputted as information purely indicative of only the difference between rising- and falling-edge components appearing within one field period. Accordingly, it ispossible to increase the accuracy at which the state of focus (near focus and far focus) of the optical system is detected, and it is not necessary to use an integrating circuit having a very wide dynamic range.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIGS. 5(a) and 5(b) are explanatory views of the operational principle of the first embodiment;

FIG. 6 is a view showing the relation between the state of focus and a video signal waveform;

FIGS. 7A, 7B and 7C are views showing waveforms obtainable from a general subject;

FIG. 8 is a schematic block diagram of a second embodiment of the present invention;

FIGS. 15A, 15B and 15C are views showing video signal waveforms in the apparatus;

FIG. 20 is a schematic explanatory view of another example of the diaphragm according to the embodiments of the present invention.

DETAILED DESCRIPTION OF THE PREFERRED EMBODIMENTS

Preferred embodiments of the present invention will be described below with reference to the accompanying drawings.

FIRST EMBODIMENT

Figure 3:
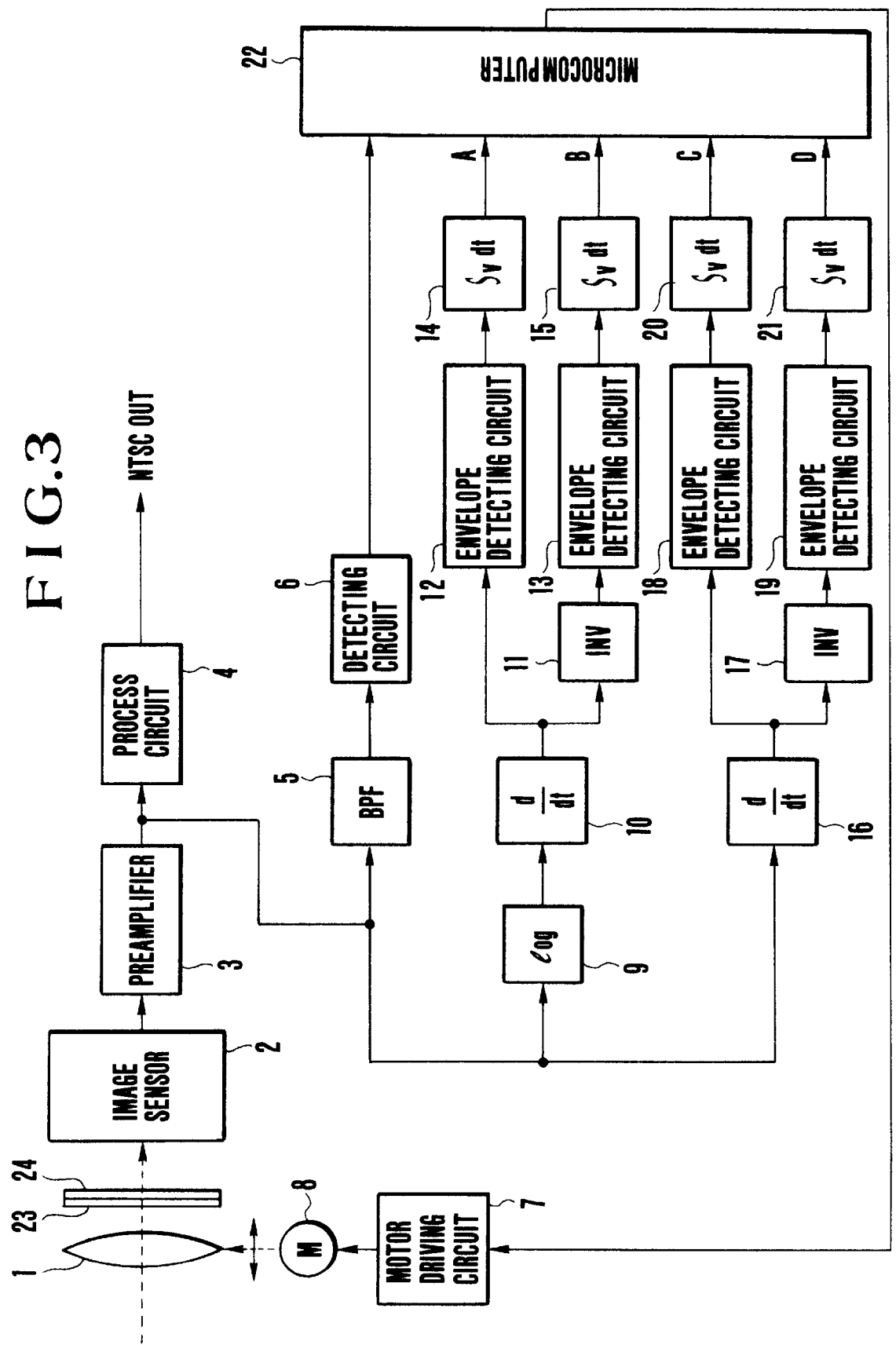
FIG. 3 is a schematic block diagram of a first embodiment of the present invention.

FIG. 3 is a block diagram of an image sensing apparatus according to a first embodiment of the present invention. In the arrangement shown in FIG. 3, constituent elements 1 through 8 are substantially identical to the corresponding ones used in the related-art example shown in FIG. 1. The arrangement shown in FIG. 3 further includes a motor driving circuit 7 for executing logic control based on a microcomputer, a logarithmic amplifier 9 for logarithmically compressing a video signal, differentiating circuits 10 and 16 for differentiating respective video signals supplied thereto, inverting amplifiers 11 and 17 for inverting respective differential waveforms supplied thereto, envelope detecting circuits 12, 13, 18 and 19 for outputting envelope components of the respective differential waveforms supplied thereto, integrating circuits 14, 15, 20 and 21 for integrating the respective envelope detection outputs supplied thereto at intervals of one vertical scanning period, and a microcomputer 22 for calculating the driving direction and driving speed of the motor 8 on the basis of the outputs of the respective integrating circuits 14, 15, 20 and 21 as well as the output of the detecting circuit 6.

Figure 4:
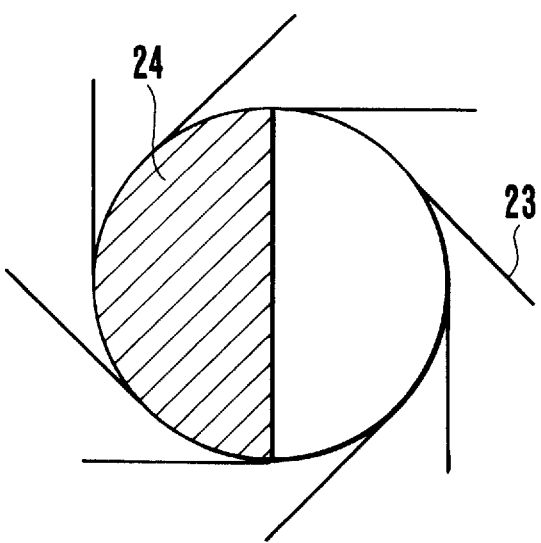
FIG. 4 is a schematic explanatory view of a diaphragm according to the first embodiment.

FIG. 4 is a schematic view showing the shape of the aperture of a diaphragm used in an image sensing optical system in the first embodiment. The diaphragm shown in FIG. 4 includes diaphragm blades 23 and an ND (neutral density) filter 24 having a transmission ratio of 50%.

FIGS. 5(a) and 5(b) show different states of focus of the image sensing optical system using the diaphragm shown in FIG. 4. Referring to FIG. 5(a), if a subject is present at a location "p", an image point is formed at a location "p'" and the state of focus is far focus with respect to an image sensing plane 2-1 of the image sensor 2. During this time, since the amount of light of the portion of a pencil of light rays which is transmitted through the ND filter 24, i.e., the hatched part of FIG. 5(a), is half the amount of light of the other portion of the pencil of light rays, the luminance of the resultant unsharp image exhibits the state shown in Part A1 of FIG. 5(a). That is to say, referring to the difference in the amount of light between the right- and left-side parts of the unsharp image with respect to the center of the width of the unsharp image (hereinafter referred to as the "unsharpness width"), the amount of light of the left-side part is half the amount of light of the right-side part.

Referring to FIG. 5(b), if the subject is present at a location "q", an image point is formed at a location "q'" and the state of focus is near focus with respect to the image sensing plane 2-1 of the image sensor 2. During this time, the luminance of the resultant unsharp image exhibits the state shown in Part B1 of FIG. 5(b), which is opposite to that described in connection with the far focus. That is to say, referring to the difference in the amount of light between the right- and left-side parts of the unsharp image with respect to the center of the unsharpness width, the amount of light of the right-side part is half the amount of light of the left-side part. Since the output waveform of the image sensor 2 is proportional to the amount of light, the respective waveforms shown in Parts A1 and B1 exhibit symmetrical shapes.

The above description refers to the waveforms of the unsharp images of the subject which is present as a single point. However, a general subject, for example, a pattern in which a white subject having a certain extent of area is present against a black background as shown in FIG. 6 exhibits the following waveform.

By way of example, reference is made to a scanning line indicated by "a" in FIG. 6. If a projected image corresponding to the scanning line "a" is in focus, a video signal obtained at this time exhibits the waveform shown as "b" in FIG. 6. In the case of a general diaphragm having an aperture of horizontally asymmetrical shape, if a projected image passing through such a diaphragm is out of focus, a video signal obtained at this time exhibits the waveform shown as "c" in FIG. 6.

If a similar subject is photographed by means of the diaphragm having the aperture of the shape shown in FIG. 4, a video signal obtained during an in-focus state exhibits a waveform substantially identical to that described above in connection with the general diaphragm. However, a video signal obtained during an out-of-focus state, for example, a far-focus state, exhibits a waveform such as that shown in Part A2 of FIG. 5(a). Contrarily, in the case of a near-focus state, the resultant video signal exhibits a waveform such as that shown in Part B2 of FIG. 5(b).

More specifically, the rising portion of the video signal obtained during the far-focus state exhibits a waveform whose slope varies on the right and left sides of the center of an unsharpness width $\Delta d$, that is, the right-side part (a part extending from the center in the positive direction along the time axis of Part A2) exhibits a sharp slope, while the left-side part (a part extending from the center in the negative direction along the time axis of Part A2) exhibits a moderate slope. The video signal has a falling portion having a similar waveform, that is, the right-side part of the falling portion exhibits a sharp slope, while the left-side part of the falling portion exhibits a moderate slope. Contrarily, in the case of the near-focus state, the rising portion of the video signal exhibits a waveform which has a right-side part of moderate slope and a left-side part of sharp slope on the opposite sides of the center of the unsharpness width $\Delta d$. The falling portion of the video signal has a similar waveform, that is, the right-side part exhibits a moderate slope, while the left-side part exhibits a sharp slope.

The video signal waveform of Part A2 or B2 described above is obtained from the output of the preamplifier 3 shown in FIG. 3. The differentiating circuit 16 differentiates the video signal waveform to provide a corresponding one of the output waveforms shown in Part A3 of FIG. 5(a) and Part B3 of FIG. 5(b). As can be seen from Parts A3 and B3, the waveform of the rising portion and that of the falling portion are opposite in polarity and equal in peak value, and this relationship is maintained whether during the near-focus state or the far-focus state.

The video signal waveform outputted from the preamplifier 3 is also supplied to the logarithmic amplifier 9 shown in FIG. 3. The logarithmic amplifier 9 logarithmically compresses the video signal waveform to provide a corresponding one of the output waveforms shown in Part A4 of FIG. 5(a) and Part B4 of FIG. 5(b). In the case of the far-focus state, the rising portion of the output video signal exhibits a waveform whose right- and left-side slopes on the opposite sides of the center of the unsharpness width Δd show a relatively small difference in sharpness, whereas the falling portion of the output video signal exhibits a waveform whose right- and left-side slopes on the opposite sides of the center of the unsharpness width Δd show a relatively large difference in sharpness. Contrarily, in the case of the near-focus state, the rising portion of the output video signal exhibits a waveform whose right- and left-side slopes show a relatively large difference in sharpness, whereas the falling portion of the output video signal exhibits a waveform whose right- and left-side slopes show a relatively small difference in sharpness.

The differentiating circuit 10 differentiates the logarithmically compressed video signal to provide either one of the waveforms shown in Part A5 of FIG. 5(a) and Part B5 of FIG. 5(b) according to whether the state of focus is far focus or near focus. More specifically, in the case of the far-focus state, the waveform of the rising portion has positive polarity and a relatively small peak value, whereas the waveform of the falling portion has negative polarity and a relatively large peak value. Contrarily, in the case of the near-focus state, the waveform of the rising portion has positive polarity similarly to the waveform obtained during the far-focus state, but its peak value becomes larger. The waveform of the falling portion still has negative polarity, but its peak value becomes smaller.

In the case of a more general subject, one rising portion and one falling portion do not necessarily appear as described above, and a plurality of rising and falling portions are in many cases present as shown in FIG. 7A. The envelope detecting circuit 12 shown in FIG. 3 forms the waveform shown in FIG. 7C from the differential waveform shown in FIG. 7B. The thus-obtained envelope detection output is integrated by one field period by the integrating circuit 14, and the integral output of the integrating circuit 14 is A/D converted by and read into the microcomputer 22. This read value is referred to as "A". This process relates to only the positive waveform of the output of the differentiating circuit 10, that is, the waveform of the rising portion of the video signal waveform. Regarding the negative waveform of the output of the differentiating circuit 10, the negative waveform output is inverted by the inverting amplifier 11 and is then subjected to similar processing by the envelope detecting circuit 13 and the integrating circuit 15. The integral output of the integrating circuit 15 is A/D converted by and read into the microcomputer 22. This read value is referred to as "B".

If it is assumed that rising and falling portions which are equal in level and number are present in a video signal waveform for one field period, as can be seen from Part A5 of FIG. 5(a) and Part B5 of FIG. 5(b), the following relationships are obtained:

if A<B, far focus, if A>B, near focus.

In the case of a far more general subject, the rising and falling portions of the video signal waveform are not necessarily present in the above-described equal relation. For this reason, a decision is made as to the near-focus state and the far-focus state by means which will be described below, Referring again to FIG. 3, the video signal waveform obtained from the preamplifier 3 is also supplied to and differentiated by the differentiating circuit 16. If the rising and falling portions of the video signal waveform are present in the above-described equal relation, the differentiating circuit 16 provides an output waveform having the same positive and negative peak values irrespective of whether the state of focus is near focus or far focus. If there is a difference in level, number or the like between the rising and falling portions of the video signal waveform, a corresponding difference occurs between the positive and negative waveforms of the output waveform of the differentiating circuit 16. In other words, the output of the differentiating circuit 16 represents only a difference between the rising waveform and the falling waveform of the video signal irrespective of a difference between the near-focus state and the far-focus state.

As in the case of the video signal logarithmically compressed by the logarithmic amplifier 9, the thus-obtained output of the differentiating circuit 16 is converted into an envelope waveform by the envelope detecting circuit 18. This envelope waveform is integrated by one field period by the integrating circuit 20, and the integral output of the integrating circuit 20 is A/D converted by and read into the microcomputer 22. This read value corresponds to the positive waveform of the output of the differentiating circuit 16, and is referred to as "C". Regarding the negative waveform of the output of the differentiating circuit 16, the negative waveform output is inverted by the inverting amplifier 17 and is then subjected to similar processing by the envelope detecting circuit 19 and the integrating circuit 21. The integral output of the integrating circuit 21 is A/D converted by and read into the microcomputer 22. This read value is referred to as "D".

The microcomputer 22 performs the following computations by using the values A, B, C and D obtained in the above-described manner:

if A/C<B/D, far focus, if A/C>B/D, near focus.

In these relationships, A/C and B/D are normalized values obtained by dividing the values A and B, which represent information indicative of near focus or far focus and information indicative of the ratio of the rising-portion component of the video signal to the falling-portion component thereof, by the respective values C and D which represent only information indicative of the ratio of the rising-portion component of the video signal to the falling-portion component thereof. Accordingly, the above relationships can be computed by using only information indicative of near focus or far focus.

A decision as to whether the state of focus is in focus can be made on the basis of whether the difference between the normalized values A/C and B/D is smaller than a predetermined constant value. More specifically, the microcomputer 22 performs a computation on the following relationship:

if |A/C−B/D|<CONSTANT, the state of focus is in focus.

Figure 1:
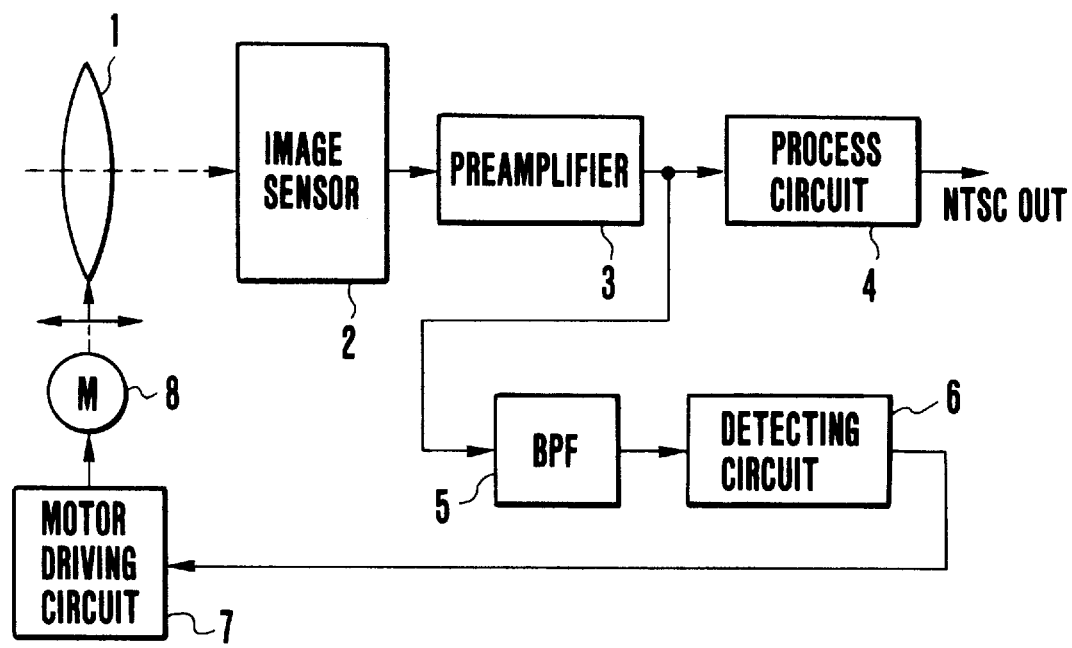
FIG. 1 is a schematic block diagram of a conventional example.
Figure 2:
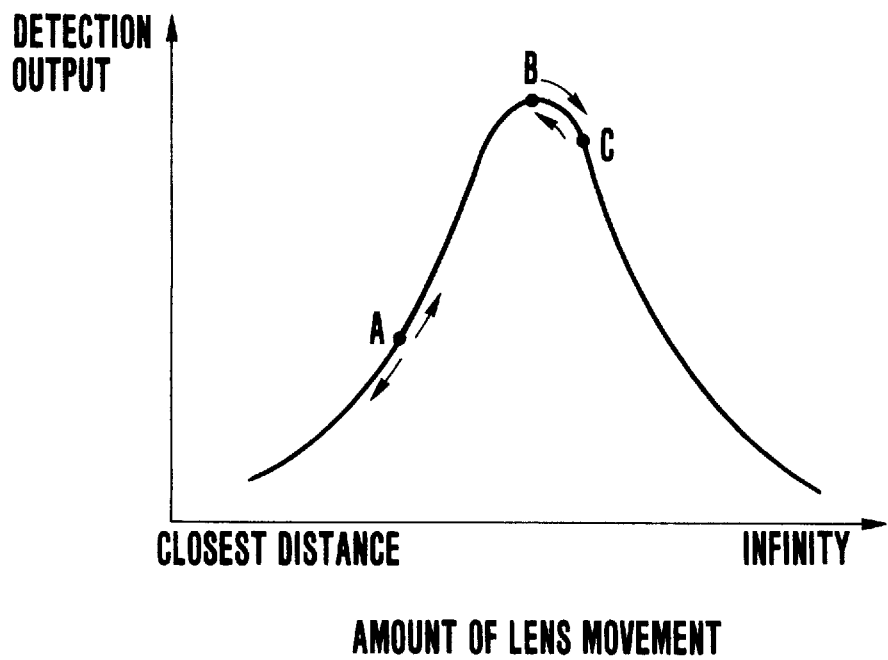
FIG. 2 is a graphic representation aiding in explaining the conventional example.

In a manner similar to that described previously in connection with the related art shown in FIG. 1, the microcomputer 22 extracts a high-frequency component contained in the video signal by using the BPF 5 and the detecting circuit 6 both of which are shown in FIG. 3, and the image sensing lens 1 is driven in the direction in which the extracted high-frequency component increases. During this process, the microcomputer 22 determines whether a projected image is in focus, and if the projected image is out of focus, the microcomputer 22 uses the above-described relationships to determine whether the state of focus is near focus or far focus. On the basis of the result of this decision, the microcomputer 22 outputs to the motor driving circuit 7 a signal for starting and stopping the motor 8 for driving the image sensing lens 1.

SECOND EMBODIMENT

FIG. 8 is a block diagram of an image sensing apparatus according to a second embodiment of the present invention. In the arrangement shown in FIG. 8, the constituent elements 1 through 8 are substantially identical to the corresponding ones used in the first embodiment shown in FIG. 3. The arrangement shown in FIG. 8 further includes a gain control circuit 30, an inverting amplifier 31, logarithmic amplifiers 32 and 34, linear amplifiers 33 and 35, differentiating circuits 36 to 39, envelope detecting circuits 40 to 43, integrating circuits 44 to 47 for performing integration at intervals of one vertical scanning period, and a logic control part 48.

In operation, a subject image formed by the image sensing lens 1 is converted into an electrical signal by the image sensor 2, and the electrical signal is amplified to a suitable level by the preamplifier 3. The output of the preamplifier 3 is applied to the gain control circuit 30 and two output signals of different levels are outputted from the gain control circuit 30. One of the output signals is applied to the logarithmic amplifier 32 and to the linear amplifier 33, and the logarithmic amplifier 32 and the linear amplifier 33 output a logarithmically compressed waveform and a linearly amplified waveform, respectively. The output signals of the logarithmic amplifier 32 and the linear amplifier 33 are respectively converted into differential waveforms by the differentiating circuits 36 and 37. The respective envelope components of the differential waveforms are extracted by the envelope detecting circuits 40 and 41, and are then integrated by the integrating circuits 44 and 45 at intervals of one vertical scanning period. The integral values are respectively referred to as "A" and "C".

The other output signal of the gain control circuit 30 is inverted in polarity by the inverting amplifier 31, and the output of the inverting amplifier 31 is subjected to processing similar to the above-described one by means of the differentiating circuits 38 and 39, the envelope detecting circuits 42 and 43 and the integrating circuits 46 and 47. The thus-obtained outputs are referred to as "B" and "D".

As described previously in connection with the first embodiment, the thus-obtained values A and B are values which represent information indicating whether the subject image is in near focus or far focus and information indicative of the ratio of the rising-edge component of the video signal waveform of the subject to the falling-edge component thereof. The values C and D are values which represent only information indicative of the ratio of the rising-edge component of the video signal waveform of the subject to the falling-edge component thereof.

The values A, B, C and D are supplied to the logic control part 48. The logic control part 48 first calculates a gain for the gain control circuit 30 so that the values C and D become equal, and outputs a control signal based on the result of this calculation to the gain control circuit 30. On the basis of the control signal, the gain control circuit 30 controls its two output signal levels so that the rising-edge component of one of the two outputs and the falling-edge component of the other output become equal. The two output signals controlled in this manner are simultaneously applied to the respective logarithmic amplifiers 32 and 34. The outputs of the logarithmic amplifiers 32 and 34 are respectively passed through the differentiating circuits 36 and 38, and the outputs of the differentiating circuits 36 and 38 are applied to the respective integrating circuits 44 and 46. Thus, the values A and B are obtained from the respective integrating circuits 44 and 46. Since the values A and B are those obtained on the basis of the signals which have been controlled so that the rising-edge and falling-edge components of the video signal waveform of the subject become equal, the values A and B purely represent only information indicating whether the subject image is in near focus or far focus. Thus, the logic control part 48 makes a decision based on the following relationships:

if A>B, near focus, if A<B, far focus, and determines the direction of driving of the motor 8 on the basis of this decision.

Also, the logic control part 48 makes a decision as to whether the motor 8 is made to stop or not, based on the following relationship:

if $|A-B|<$CONSTANT, in focus.

The logic control part 48 also extracts a high-frequency component contained in the video signal by using the BPF 5 and the detecting circuit 6, and causes the motor driving circuit 7 to drive the motor 8 in the direction in which the value of the extracted high-frequency component increases. During this process, the logic control part 48 determines whether the state of focus is in focus, and if the state of focus is out of focus, the logic control part 48 uses the above-described relationships to determine whether the state of focus is near focus or far focus. On the basis of the result of this decision, the logic control part 48 determines whether the motor 8 is to be driven or stopped, and if the motor 8 is to be driven, the logic control part 48 determines whether the motor 8 is to be driven toward an infinity side or a closest-distance side, and sends information indicative of this decision to the motor driving circuit 7. In the above-described manner, it is possible to ensure a detection accuracy higher than that of the first embodiment.

Figure 9:
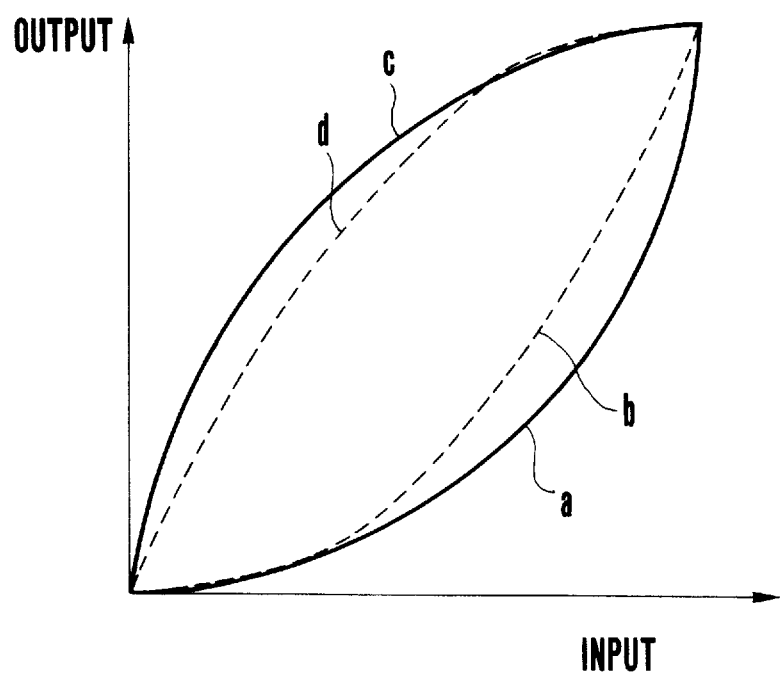
FIG. 9 is a graphic representation aiding in explaining a modification of the second embodiment.

In the second embodiment, the logarithmic amplifiers 32, 34 and the linear amplifiers 33, 35, shown in FIG. 8, are not limited to specific types of amplifiers having such characteristics. The amplifiers 32 and 34 may be selected from among amplifiers having nonlinear characteristics, and the amplifiers 33 and 35 may be selected from among amplifiers having nonlinear characteristics different from the above-described nonlinear characteristics. For example, the characteristic of each of the amplifiers 32 and 34 may also be the γ characteristic shown by a curve "a" in FIG. 9 or the square characteristic shown by a curve "b" in FIG. 9. Similarly, the characteristics of the amplifiers 33 and 35 may also be the inverse of such characteristics, as shown by curves "c" and "d" in FIG. 9.

In the case of an arrangement in which an inverted output can be obtained from the gain control circuit 30, it is not necessary to add the inverting amplifier 31.

THIRD EMBODIMENT

Figure 10:
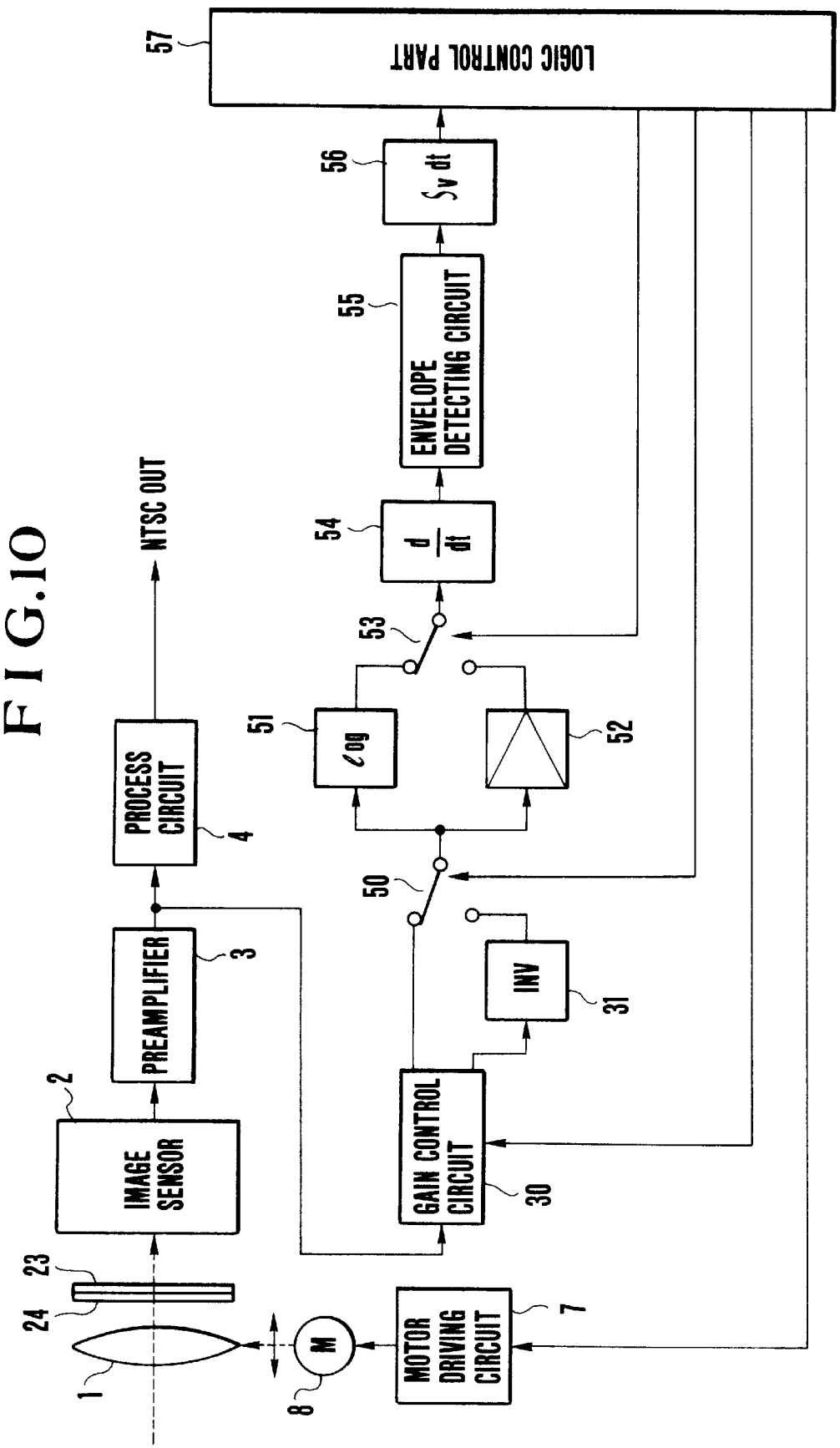
FIG. 10 is a schematic block diagram of a third embodiment of the present invention.

FIG. 10 is a block diagram of an image sensing apparatus according to a third embodiment of the present invention. The third embodiment is intended to simplify the arrangement of the second embodiment by utilizing a selecting switch.

In the arrangement shown in FIG. 10, the constituent elements 1 through 8 and 30, 31 are substantially identical to the corresponding ones used in the second embodiment. The arrangement shown in FIG. 10 further includes a logarithmic amplifier 51, a linear amplifier 52, a differentiating circuit 54, an envelope detecting circuit 55, an integrating circuit 56, a logic control part 57 and selecting switches 50 and 53.

In operation, as described previously in connection with the second embodiment, a subject image projected by the image sensing optical system is converted into a video signal by the image sensor 2, and the video signal is outputted therefrom. The video signal, amplified by the preamplifier 3, is applied to the gain control circuit 30 and two output signals according to controlled gains are outputted from the gain control circuit 30. One of the output signals is converted into a waveform signal of inverted polarity by the inverting amplifier 31.

Figure 11:
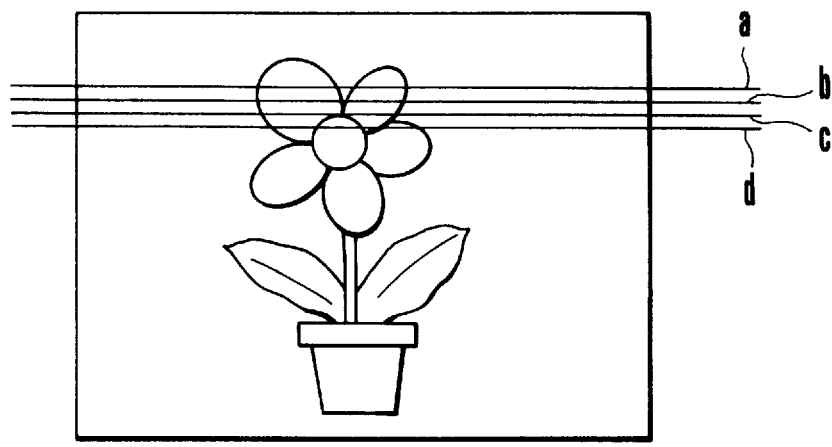
FIG. 11 is an explanatory view of the operational principle of the third embodiment.

In general, a video signal is obtained by scanning a picture in the horizontal direction and sequentially from the top line, as shown in FIG. 11, and a video signal waveform obtained by scanning a scanning line "a" is approximately equal to a video signal waveform obtained by scanning the next scanning line "b". Similarly, it is apparent that video signal waveforms obtained by scanning the following scanning lines "c" and "d" become nearly the same waveforms.

Figure 12:
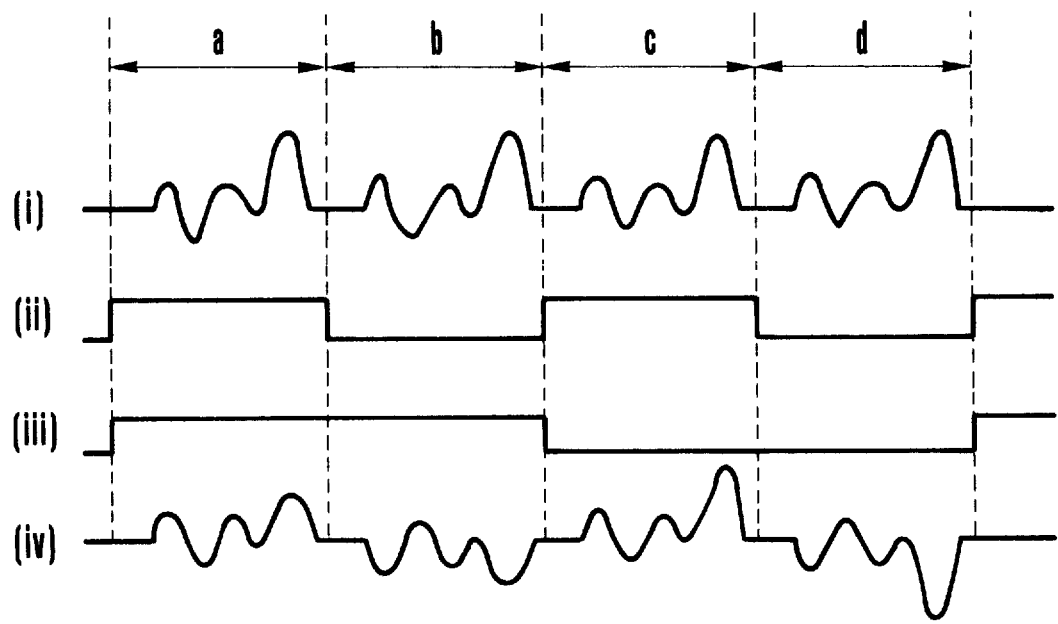
FIG. 12 is a waveform chart showing waveforms provided by the essential elements of the third embodiment.

The two outputs of the gain control circuit 30 are switched at intervals of one horizontal scanning line by the selecting switch 50 shown in FIG. 10, and the output of the logarithmic amplifier 51 and the output of the linear amplifier 52 are switched at intervals of two horizontal scanning lines by the selecting switch 53. Such switching is realized by the logic control part 57 transmitting signals having the waveforms (ii) and (iii) shown in FIG. 12 to the respective selecting switches 50 and 53. If the waveform (i) shown in FIG. 12 represents the video signal waveform obtained by scanning the scanning lines "a" to "d" shown in FIG. 11, a signal waveform obtained after the switching has been performed by the selecting switches 50 and 53 becomes as shown in Part (iv). More specifically, in the waveform (iv), an area "a" is occupied by a logarithmically compressed waveform of positive polarity, an area "b" by a logarithmically compressed waveform of negative polarity, an area "c" by a linearly amplified waveform of positive polarity, and an area "d" by a linearly amplified waveform of negative polarity.

The logic control part 57 performs the above-described switching through one picture. Each of the waveforms obtained by the switching is applied to the differentiating circuit 54, in which its edge component is extracted. The edge component is converted into an envelope waveform by the envelope detecting circuit 55, and the envelope waveform is integrated by one vertical scanning period by the integrating circuit 56 and the integral output of the integrating circuit 56 is supplied to the logic control part 57. The logic control part 57 reads the integral output through A/D conversion in accordance with the switching of each of the switches 50 and 53, and obtains as a value C the output of the integrating circuit 56 that corresponds to the area "c" representative of the total amount of the rising-edge component of the video signal linearly amplified by the linear amplifier 52 and also obtains as a value D the output of the integrating circuit 56 that corresponds to the area "d" representative of the total amount of the falling-edge component of such linearly amplified video signal. The logic control part 57 controls the gains of the two outputs of the gain control circuit 30 so that the values C and D become equal.

The two outputs of the gain control circuit 30 which have been controlled in the above-described manner are each logarithmically compressed by the logarithmic amplifier 51, so that the output of the integrating circuit 56 which corresponds to the area "a" representative of the total amount of the rising-edge component of the logarithmically compressed waveform is obtained as a value A, whereas the output of the integrating circuit 56 which corresponds to the area "b" representative of the total amount of the falling-edge component of the logarithmically compressed waveform is obtained as a value B.

The difference between the values A and B is based on only the difference between the near-focus state and the far-focus state of the image sensing optical system, because the difference between the rising edge and the falling edge of the subject image due to a discrepancy therebetween is cancelled. Accordingly, the logic control part 57 makes a decision based on the following relationships:

if A>B, near focus, if A<B, far focus, if |A/C−B/D|<CONSTANT, in focus.

On the basis of the result of this decision, the logic control part 57 determines the direction of driving of the motor 8 and transmits an instruction to the motor driving circuit 7. In the above-described manner, it is possible to ensure a detection accuracy equivalent to that of the second embodiment.

In the third embodiment, the switching operation of the switch 50 is performed at intervals of one horizontal line, while the switching operation of the switch 53 is performed at intervals of two horizontal lines. However, such intervals are not limitative examples. The switch 50 may be switched at intervals of two horizontal line, while the switch 53 may be switched at intervals of on horizontal line. Such a switching operation may also be performed not in units of one line but in units of one picture (one frame).

In each of the above-described embodiments, the shape of the aperture of the diaphragm of the image sensing optical system is selected to be horizontally asymmetrical. This is because in general video cameras a picture is horizontally scanned for obtaining a video signal and the horizontally asymmetrical shape is well suited to carry out signal processing according to the present invention by making use of the video signal on "as is scanned" basis.

As is known to those skilled in the art, a system has presently been proposed for detecting an edge portion of a picture as well as a high-frequency component thereof in the vertical direction, and such a system is disclosed, for example, in Japanese Patent Publication No. Sho 62-38083, entitled "FOCUS ADJUSTING APPARATUS". If the present invention is to be used with the system, the shape of the aperture of the diaphragm of the image sensing optical system only needs to be made vertically asymmetrical in practice, as shown in FIG. 20.

In each of the above-described embodiments, the shape of the aperture of the diaphragm of the image sensing optical system is made asymmetrical by using the ND filter. However, the ND filter is not a limitative example and other types of filters may be used. Further, no filter may be used, and the aperture of the diaphragm may be formed in a shape other than a circle so that a horizontal or vertical transmission ratio of light can be changed.

As is apparent from the above description, the shape of the aperture of the diaphragm of the image sensing optical system is made asymmetrical horizontally or vertically, and by detecting a change in a video signal waveform corresponding to the edge portion of a subject image projected on the image sensing plane, it is possible to determine whether the projected image is in focus or, if it is out of focus, whether the state of focus is near focus or far focus. Accordingly, it is possible to effect a focusing operation smoothly and efficiently by a simple mechanism.

FOURTH EMBODIMENT

A fourth embodiment of the present invention will be described below.

Figure 13:
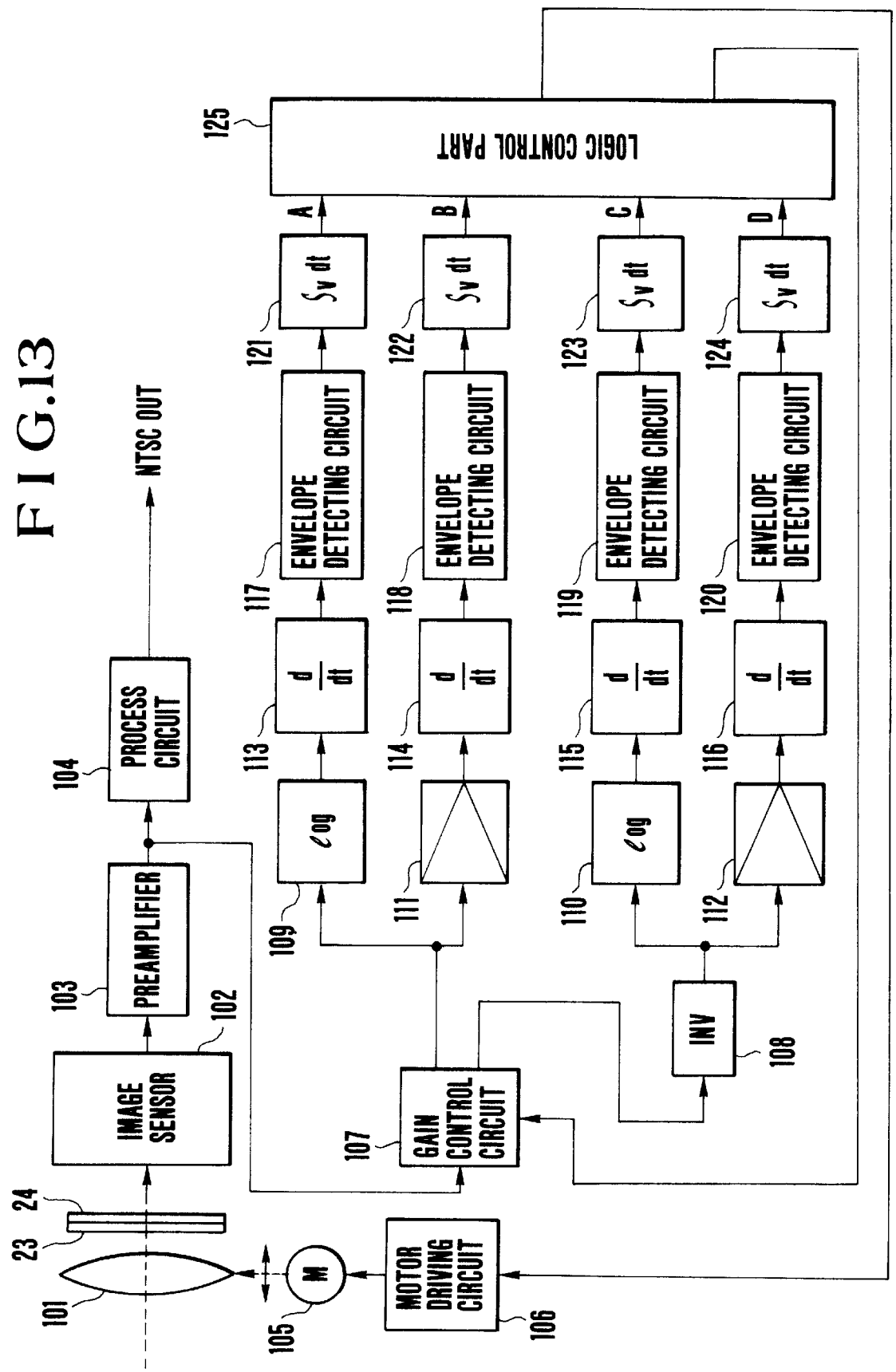
FIG. 13 is a schematic block diagram of a fourth embodiment of the present invention.

FIG. 13 is a block diagram showing a fourth embodiment of the present invention. Similarly to each of the above-described first to third embodiments, the fourth embodiment is also directed to a system in which a diaphragm having an aperture of horizontally (or vertically) asymmetrical shape is utilized to determine whether the state of focus of a subject image is near focus, in focus or far focus, thereby effecting a focus adjusting operation. The fourth embodiment merely differs from the first to third embodiments in circuit arrangement, and the fourth embodiment is provided with a gain control circuit for stabilizing a signal level. The arrangement shown in FIG. 13 includes an image sensing lens (optical system) 101, an image sensor 102 for converting a subject image projected by the image sensing lens 101 into an electrical signal, a preamplifier 103 for amplifying the electrical signal to a suitable level, a process circuit 104 for converting the output of the preamplifier 103 into a standardized signal such as an NTSC television signal, a motor 105 for driving the image sensing lens 101, a motor driving circuit 106 for driving the motor 105 on the basis of an driving information output from a logic control part 125 which will be described later, a gain control circuit 107 for providing two outputs according to different gains from the output of the preamplifier 103, an inverting amplifier (INV) 108, first and second logarithmic amplifiers (log) 109 and 110, first and second linear amplifiers 111 and 112, first, second, third and fourth differentiating circuits (d/dt) 113, 114, 115 and 116, first, second, third and fourth envelope detecting circuits 117, 118, 119 and 120, first, second, third and fourth integrating circuits ($\int_v dt$) 121, 122, 123 and 124 for performing interval integration at intervals of one vertical scanning period (hereinafter referred to as "1V"), and the logic control part 125.

A subject image formed by the image sensing lens 101 is converted into an electrical signal by the image sensor 102, and the electrical signal is amplified to a suitable level by the preamplifier 103. As described previously, the shape of the aperture of the diaphragm of the image sensing lens 101 is as shown in FIG. 4. A focus detecting operation utilizing the diaphragm having such an aperture shape is substantially identical to that described previously with reference to FIGS. 5(a), 5(b) through 7.

More specifically, a waveform output, such as either of those shown in FIGS. 5(a) and 5(b), is obtained from the output of the preamplifier 103 shown in FIG. 13, and the waveform output is converted into two waveforms of different levels by the gain control circuit 107. One of the outputs of the gain control circuit 107 is inputted to the first logarithmic amplifier 109 and to the first linear amplifier 111, and the first logarithmic amplifier 109 outputs a logarithmically compressed waveform, while the first linear amplifier 111 outputs a linearly amplified waveform.

In the case of the subject shown in FIG. 6, the output waveform of the first linear amplifier 111 corresponds to the waveform A2 of FIG. 5(a) or the waveform B2 of FIG. 5(b), while the output waveform of the first logarithmic amplifier 109 corresponds to the waveform A4 of FIG. 5(a) or the waveform B4 of FIG. 5(b). More specifically, in the case of a far-focus state, as compared to the output waveform of the first linear amplifier 111, the output waveform of the first logarithmic amplifier 109 has a rising-edge waveform whose slope shows a relatively small difference in sharpness on the opposite sides of the center of the unsharpness width Δd and a falling-edge waveform whose slope shows a relatively large difference in sharpness on the opposite sides of the center of the unsharpness width Δd, as shown by the waveform A4 of FIG. 5(a). In the case of a near-focus state, the output waveform of the first logarithmic amplifier 109 has a rising-edge waveform whose slope shows a relatively large difference in sharpness on the opposite sides of the center of the unsharpness width Δd and a falling-edge waveform whose slope shows a relatively small difference in sharpness on the opposite sides of the center of the unsharpness width Δd, as shown by the waveform B4 of FIG. 5(b).

When the output of the first logarithmic amplifier 109 and that of the first linear amplifier 111 are respectively differentiated by the first and second differentiating circuits 113 and 114, the waveforms A5 and A3 shown in FIG. 5(a) are formed, respectively. The waveform A5 of FIG. 5(a) shows the output waveform of the first differentiating circuit 113 which is obtained during a far-focus state, and exhibits a relatively large value in the "−" direction and a relatively small value in the "+" direction with respect to the zero output level.

The waveform B5 of FIG. 5(b) shows the output waveform of the first differentiating circuit 113 which is obtained during a near-focus state, and exhibits a relatively small value in the "−" direction and a relatively large value in the "+" direction with respect to the zero output level. The waveforms A3 and B3 of FIGS. 5(a) and 5(b) represent the output waveforms of the second differentiating circuit 114 each of which exhibits an approximately equal level in both of the "−" and "+" directions with respect to the zero output level irrespective of whether the state of focus is far focus or near focus.

Unlike the differential waveforms A3 and B3 of the linearly amplified waveforms A2 and B2, the differential waveforms A5 and B5 of the logarithmically compressed waveforms A4 and B4 show that the output levels of their respective "+" and "−" components depend upon whether the state of focus is far focus or near focus. Accordingly, by detecting a difference between these "+" and "−" components, it is possible to determine whether the subject image projected on the image sensor 102 is in focus, in near focus or in far focus.

In the case of the subject shown in FIG. 6, since the rising- and falling-edge components contained in the obtained video signal are equally present therein, it is possible to determine the state of focus from only the differential output of the logarithmically compressed waveform as described above. However, in the case of a general subject, the rising- and falling-edge components contained in the obtained video signal are not necessarily equally present therein.

The video signal waveform of such a general subject is shown in Part "a" of FIG. 7A. When the envelope component of this video signal waveform is extracted in the first envelope detecting circuit 117 shown in FIG. 13, the video signal waveform shown in FIG. 7C is formed. When the thus-extracted envelope detection output is subjected to interval integration in the integrating circuit 121 shown in FIG. 13 at 1V intervals, the total amount of the rising-edge component of the logarithmically compressed video signal waveform within one picture (one field) is obtained.

Similarly, the total amount of the rising-edge component of the linearly amplified video signal waveform within one picture is obtained through the second envelope detecting circuit 118 and the second integrating circuit 122. Further, the total amount of the falling-edge component of the logarithmically compressed video signal waveform is obtained through the third envelope detecting circuit 119 and the third integrating circuit 123, as well as the total amount of the falling-edge component of the linearly amplified video signal waveform within one picture is obtained through the fourth envelope detecting circuit 120 and the fourth integrating circuit 124.

It is assumed here that the integral outputs obtained in the above-described manner are respectively represented by symbols A, B, C and D. If the rising- and falling-edge components contained in a subject image are equally present within one picture, the value of the integral output B representative of the rising-edge component of the linearly amplified waveform and the value of the integral output D representative of its falling-edge component become equal to each other.

On the other hand, if the rising- and falling-edge components contained in the subject image are unequally present within one picture, the values of the integral outputs B and D differ correspondingly.

The logic control part 125 supplies a control signal to the gain control circuit 107 so that the values of the integral outputs B and D become equal. Accordingly, even if the rising- and falling-edge components contained in the video signal waveform of the aforesaid subject image are not equal to each other, the rising-edge component of one of the two outputs of the gain control circuit 107 and the falling-edge component of the other output can be made equal to each other.

Accordingly, the difference between the rising-edge components of the video signal waveforms outputted from the first and second logarithmic amplifiers 109 and 110 is based on only the difference between the near-focus state and the far-focus state of the image sensing lens 101 which purely serves as an optical system, because the difference between the rising- and falling-edge components contained in the video signal waveform of the subject image itself is cancelled. Accordingly, the logic control part 125 makes a decision based on the following relationships by using the values of the integral outputs A and B obtained from the respective logarithmically compressed outputs:

if A>B, near focus, if A<B, far focus.

On the basis of the result of this decision, the logic control part 125 determines the direction in which the motor 105 is to be rotationally driven. Also, the logic control part 125 makes a decision based on the following relationship:

if |A−B|<CONSTANT, in focus.

On the basis of the result of this decision, the logic control part 125 determines whether the motor 105 is to be stopped.

According to each of the above-described embodiments, there are some cases where the difference between the near focus and the far focus of the image sensing lens 101 which constitutes the optical system, i.e., the difference between the video signal waveform outputted from the nonlinear amplifier circuit and that outputted from the linear amplifier circuit, becomes extremely small, depending on a subjected to be photographed.

For example, this phenomenon occurs in the case of a subject of low illuminance and low contrast. In the case of such a subject, the nonlinear amplifier circuit needs to have a dynamic range over the entire range of video signal levels which are inputted on a monotonic-increase basis. However, since small variations only occur in a video signal waveform obtained from the subject of low illuminance and low contrast, the distinction in characteristic between the nonlinear amplifier circuit and the linear amplifier circuit is substantially cancelled.

As a result, it is difficult to detect the in-focus state of such a subject by means of the logic control part 125.

According to each of the above-described embodiments, it is necessary that at least one rising-edge component and one falling-edge component be present within a picture or within a specific area which is suitably set in the picture for the purpose of in-focus detection. In the case of a subject which does not satisfy this condition, such as a so-called black-and-white edge which has only white on the right half of the picture and only black on the left half of the picture, a rising-edge component is only present within the picture so that no in-focus detection may become possible.

Further, in each of the above-described embodiments, if the rising- and falling-edge components of a video signal are to be integrated by one field period so that the respective components are processed by the envelope detecting circuits 117 to 120 and the envelope detecting circuits 121 to 124 in the respective processes of performing signal processing of the rising-edge component and the falling-edge component, each of the integrating circuits 121 to 124 needs to have a sufficient dynamic range. In many cases, the difference between the integral values of the rising- and falling-edge components outputted from the integrating circuits 121 to 124 is extremely small with respect to their dynamic ranges. It is, therefore, difficult to detect the difference between these signal outputs highly accurately in the logic control part 125.

FIFTH EMBODIMENT

A fifth embodiment which will be describe below relates to an improvement over the above-described disadvantages. According to the fifth embodiment, there is provided an in-focus detecting apparatus capable of attaining a comparatively high detection accuracy even in the case of a subject of low illuminance and low contrast and also capable of effecting in-focus detection with an accuracy similar to the accuracy of in-focus detection of a general subject even in the case of a subject containing only a rising-edge component or a falling-edge component.

According to the fifth embodiment, there is also provied an in-focus detecting apparatus in which it is possible to increase the accuracy at which the state of focus (near focus and far focus) of the optical system is detected and in which it is not necessary to use an integrating circuit having a very wide dynamic range.

More specifically, according to the fifth embodiment, there is provided a focus detecting apparatus in which a diaphragm provided for use with an optical system has an aperture of a horizontally or vertically asymmetrical shape and which is arranged to obtain a video signal waveform by converting a subject image projected by the optical system into an electrical signal by means of an image sensor and extract a variation component of the video signal waveform provided by the asymmetrical shape of the aperture of the diaphragm from the obtained video signal waveform, thereby detecting whether the subject image is in focus, out of focus with an image point of the subject image being deviated in the direction of a closest-distance end, or out of focus with the image point of the subject image being deviated in the direction of an infinity end. The focus detecting apparatus comprises a differentiating circuit for obtaining a differential waveform of the video signal waveform, a first delay circuit for delaying by a specific time the differential waveform outputted from the differentiating circuit and providing a delayed output, a second delay circuit for further delaying the delayed output of the first delay circuit and providing a delayed output, a peak holding circuit for obtaining a maximum value of the delayed output of the first delay circuit, a first sample-and-hold circuit for holding the differential waveform outputted from the differentiating circuit at the same timing as the peak holding circuit, and a second sample-and-hold circuit for holding the delayed output of the second delay circuit at the same timing as the peak holding circuit, wherein a decision as to the state of focus of the optical system is made-by comparing an output of the first sample-and-hold circuit and an output of the second sample-and-hold circuit.

According to another aspect of the fifth embodiment, there is provided an image sensing apparatus in which a diaphragm provided for use with an optical system has an aperture of a horizontally or vertically asymmetrical shape and which is arranged to obtain a video signal waveform by converting a subject image projected by the optical system into an electrical signal by means of an image sensor and extract a variation component of the video signal waveform provided by the asymmetrical shape of the aperture of the diaphragm from the obtained video signal waveform, thereby detecting whether the subject image is in focus, out of focus with an image point of the subject image being deviated in the direction of a closest-distance end, or out of focus with the image point of the subject image being deviated in the direction of an infinity end. The image sensing apparatus comprises a first envelope detecting circuit for obtaining a first envelope component relative to a rising-edge component of the video signal waveform which is nonlinearly amplified, a second envelope detecting circuit for obtaining a second envelope component relative to a falling-edge component of the video signal waveform which is nonlinearly amplified, the second envelope component being of opposite polarity to the first envelope component, a third envelope detecting circuit for obtaining a third envelope component relative to a rising-edge component of a video signal waveform which is amplified linearly or nonlinearly according to a nonlinear characteristic of the nonlinearly amplified video signal waveform, and a fourth envelope detecting circuit for obtaining a fourth envelope component relative to a falling-edge component of the video signal waveform which is amplified linearly or nonlinearly according to the nonlinear characteristic of the nonlinearly amplified video signal waveform, the fourth envelope component being of opposite polarity to the third envelope component, wherein a result obtained by adding together outputs of the respective first and second envelope detecting circuits and a result obtained by adding together outputs of the respective third fourth envelope detecting circuits are respectively integrated within a predetermined area provided in one picture to obtain individual integral values, thereby making a decision, on the basis of the integral values, as to whether the subject image is in focus, out of focus with an image point of the subject image being deviated in the direction of a closest-distance end, or out of focus with the image point of the subject image being deviated in the direction of an infinity end.

In the above-described arrangents, the values of differential waveforms before and after the instant when the maximum value of the differential waveform of a video signal is obtained are compared with each other to perform in-focus detection. Accordingly, it is possible to ensure a comparatively high detection accuracy even in the case of a subject of low illuminance and low contrast. Further, even in the case of a subject containing only a rising-edge component or a falling-edge component, it is possible to effect in-focus detection with an accuracy similar to the accuracy of in-focus detection of a general subject.

Further, in the signal processing for processing the rising- and falling-edge components of a video signal waveform, a positive envelope detection output and a negative envelope detection output are respectively obtained from the rising- and falling-edge components, and the two outputs are integrated while being added together. Thus, an integral value by integration for one field period is outputted as information purely indicative of only the difference between rising- and falling-edge components appearing within one field period. Accordingly, it is possible to increase the accuracy at which the state of focus (near focus and far focus) of the optical system is detected, and it is not necessary to use an integrating circuit having a very wide dynamic range.

Figure 14:
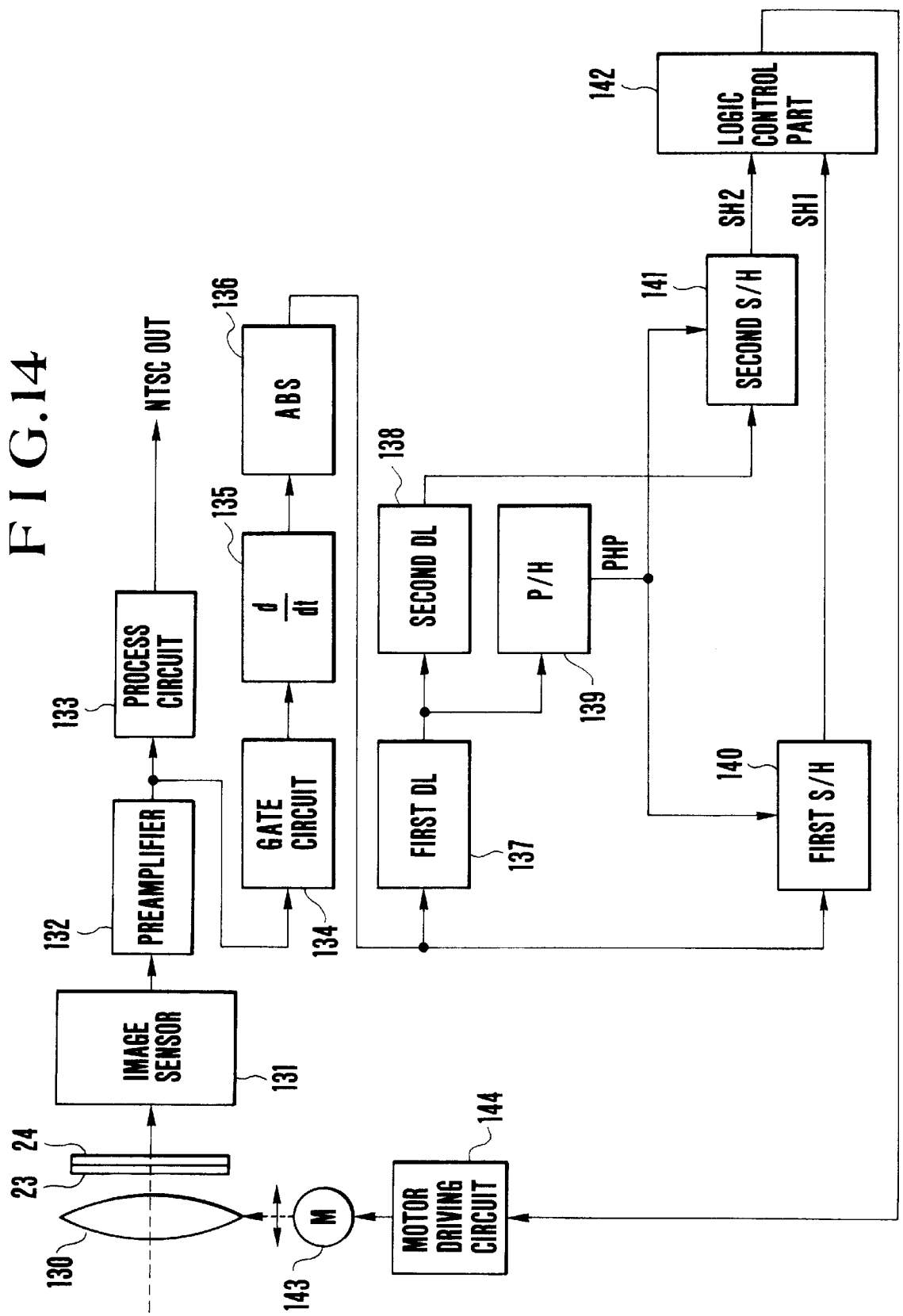
FIG. 14 is a schematic block diagram showing the arrangement of an in-focus detecting apparatus according to a fifth embodiment of the present invention.

FIG. 14 is a schematic block diagram showing the arrangement of a focus detecting system according to a fifth embodiment of the present invention. The arrangement shown in FIG. 14 includes an image sensing lens 130 which constitutes an optical system, an image sensor 131 for converting a subject image projected by the image sensing lens 130 into an electrical signal, a preamplifier 132 for amplifying the output of the image sensor 131 to a suitable level, a process circuit 133 for converting the output of the preamplifier 132 into a standardized signal such as an NTSC television signal, a gate circuit 134 for passing the portion of the output of the preamplifier 132 which corresponds to a specific area provided for realizing in-focus detection within a video picture, a differentiating circuit (d/dt) 135 for differentiating a video signal waveform gated by the gate circuit 134, an absolute-value circuit (ABS) 136 for converting a negative component of the differential waveform output of the differentiating circuit 135 into a positive component by inversion, a first delay circuit (DL) 137 for delaying the output of the absolute-value circuit 136 by a predetermined time, a second delay circuit (DL) 138 for delaying the output of the first delay circuit 137 by a further predetermined time, a peak holding circuit (P/H) 139 for obtaining a maximum value of the differential waveform delayed by the first delay circuit 137, a first sample-and-hold circuit (S/H) 140 for holding the output waveform of the absolute-value circuit 136 in synchronism with the holding timing of the peak holding circuit 139, a second sample-and-hold circuit (S/H) 141 for holding the output waveform of the second delay circuit 138 in synchronism with the holding timing of the peak holding circuit 139, a logic control part 142 for detecting the respective outputs of the first and second sample-and-hold circuits 140 and 141, making a decision as to the state of focus of the image sensing lens 130, which constitutes an optical system, on the basis of the obtained detection information, and determining the direction of driving of the image sensing lens 130, a motor 143 for driving the image sensing lens 130, and a motor driving circuit 144 for driving the motor 143 on the basis of driving information supplied from the logic control part 142.

The operation of the focus detecting system having the above-described arrangement will be described below.

A subject image projected on an image sensing plane of the image sensor 131 by the image sensing lens 130 is converted into an electrical signal by the image sensor 131, thus preparing a video signal. The video signal is amplified to a suitable level by the preamplifier 132, and is then formed into a signal corresponding to a limited area provided for performing in-focus detection within the video picture by the gate circuit 134.

If an optical system using a diaphragm having the aperture shape shown in FIG. 4 is employed to photograph a part of a black-and-white edge such as that shown in FIG. 6, the obtained video signal waveform corresponding to the scanning line "a" is as shown in Part B of FIG. 15B. If the state of the image sensing lens 130 is near focus, the waveform shown in Part A of FIG. 15A is formed, while if the state of the image sensing lens 130 is far focus, the waveform shown in Part C of FIG. 15C is formed. These waveforms are respectively converted into differential waveforms by the differentiating circuit 135, so that the waveforms shown in Parts A1, B1 and C1 of FIGS. 15A, 15B and 15C are formed according to the respective states of focus: near focus, in focus and far focus. The respective waveforms A1, B1 and C1 delayed by the first delay circuit 137 form the waveforms shown in Parts A2, B2 and C2 of FIGS. 15A, 15B and 15C, and the waveforms A2, B2 and C2 delayed by the second delay circuit 138 form the respective waveforms shown in Parts A3, B3 and C3 of FIGS. 15A, 15B and 15C. If the aforesaid video signal waveform is not a rising-edge waveform, such as the waveform shown in Part B of FIG. 15B, but a video signal waveform obtainable from a subject image having a pattern the color of which changes, for example, from white to black, the output of the differentiating circuit 135 becomes negative in polarity. However, since such a negative output is converted into an absolute value by the absolute-value circuit 136, a similar waveform is obtained.

Regarding the output of the first delay circuit 137, points P which correspond the maximum values of the respective waveforms A2, B2 and C2 of FIGS. 15A, 15B and 15C are held by the peak holding circuit 139. At this time, the peak holding circuit 139 generates a hold pulse PHP at the timing when a corresponding one of the points P is held, as shown in the waveforms A2p, B2p and C2p of FIGS. 15A, 15B and 15C.

The first sample-and-hold circuit 140 and the second sample-and-hold circuit 141 employ the hold pulses A2p, B2p and C2p to sample and hold the outputs A1, B1, C1 of the absolute-value circuit 136 and the outputs A3, B3, C3 of the second delay circuit 138, respectively. The waveforms A1s, B1s, C1s shown in FIGS. 15A, 15B and 15C are the output waveforms held by the first sample-and-hold circuit 140, while the waveforms A3s, B3s, C3s shown in FIGS. 15A, 15B and 15C are the output waveforms held by the second sample-and-hold circuit 141.

If the state of focus of the image sensing lens 130 which constitutes the optical system is near focus and a video signal waveform, such as the waveform A of FIG. 15A, is inputted, the differential output waveform of the input video signal waveform exhibits a slope which, as shown in Parts A1 to A3 of FIG. 15A, is sharp on the left side of the peak point P (on a "−" side with respect to the time axis) and moderate on the right side of the peak point P (on a "+" side with respect to the time axis).

When the waveform A1 is sampled and held at the timing of the point P of the waveform A2 of FIG. 15A, the waveform A1s is formed. The waveform A1s represents a sampled level equivalent to a level obtained by sampling the waveform A2 which is shifted leftwardly (as viewed in FIG. 15A) by an amount equivalent to the delay time of the first delay circuit 137. When the waveform A3 is sampled and held at the timing of the point P of the waveform A2 of FIG. 15A, the waveform A3s is formed. Similarly, the waveform A3s represents a sampled level equivalent to a level obtained by sampling the waveform A2 which is shifted rightwardly (as viewed in FIG. 15A) by an amount equivalent to the delay time of the second delay circuit 138.

By comparing the waveforms A1s and A3s, it will be understood that their sampled levels differ from each other, depending on the difference in slope sharpness between the right and left sides of the point P. The lower level is sampled from the sharper slope, while the higher level is sampled from the more moderate slope, and therefore A1s>A3s is obtained. Contrarily, if the state of focus of the optical system is far focus and a video signal waveform, such as the waveform C of FIG. 15C, is inputted, the differential output waveform of the input video signal waveform exhibits a slope which, as shown in Parts C1 to C3 of FIG. 15C, is moderate on the left side of the peak point P and sharp on the right side of the peak point P.

When the waveforms C1 and C3 are sampled and held at the timing of the point P of the waveform C2 of FIG. 15C, the waveforms C1s and C3s are obtained, respectively. Similarly to the waveforms A1 and A3, the waveforms C1s and C3s represent, respectively, sampled levels equivalent to levels obtained by sampling the waveform C2 which is shifted leftwardly and rightwardly (as viewed in FIG. 15C) by amounts equivalent to the respective delay times of the first and second delay circuits 137 and 138. By comparing the waveforms C1s and C3s, C1s>C3s is obtained.

If the state of focus of the optical system is in focus and a video signal waveform, such as the waveform B of FIG. 15B, is inputted, the differential output waveform of the input video signal waveform exhibits a slope which, as shown in Parts B1 to B3 of FIGS. 15A, 15B and 15C, is approximately equal in sharpness on the right and left sides of the peak point P.

When the waveforms B1 and B3 are sampled and held at the timing of the point P of the waveform B2 of FIG. 15B, the levels of the resultant waveforms are each nearly equal to zero, as shown in Parts B1s and B3s of FIG. 15B. The result is B1s≈B3s≈0.

Since the differential waveforms are directly sampled and a comparison between the sampled levels is made, the above-described differences between the output waveforms can be detected with a comparatively high accuracy even in the case of an input waveform of small signal level. Further, it is possible to perform focus detection even in the case of an input signal having either one only of a rising-edge component and a falling-edge component.

Outputs SH1 and SH2 of the respective sample-and-hold circuits 140 and 141, which are represented by the waveforms A1s, A3s, B1s, B3s, C1s, C3s, are outputted to the logic control part 142, in which the outputs SH1 and SH2 are A/D converted and a computation based on the following relationship is performed:

if SH1<SH2, far focus,
if SH1>SH2, near focus,
if SH1≈SH2, in focus.

On the basis of the result of the above-described computation, the logic control part 142 determines the state of focus of the image sensing lens 130 which constitutes the optical system, and transmits a signal for starting or stopping the motor 143 or indicative of the direction of driving thereof to the motor driving circuit 144 so that the image sensing lens 130 is focused.

The first and second sample-and-hold circuit 140 and 141 are periodically reset at intervals of, for example, one picture period of the video signal, and each time such resetting is performed, the logic control part 142 receives the outputs of the sample-and-hold circuits 140 and 141, thus continuing the operation of focusing the image sensing lens 130.

In the fifth embodiment described above, a single point P within one picture of a video signal is sampled as a representative point for the purpose of computing processing.

However, if large amounts of noise components are contained in the video signal, no accurate computation result may be obtained by the influence of the noise components.

One approach to solving this problem is to sample a multiplicity of points within one picture. For example, the first and second sample-and-hold circuits 140 and 141 may be reset at intervals of one horizontal scanning period, and one point may be sampled for each horizontal line of one picture and transmitted into the logic control part 142. Another approach is to provide a plurality of gate areas of the gate circuit 134 within one picture and sample one point for each of the gate areas.

SIXTH EMBODIMENT

A sixth embodiment of the present invention will be described below with reference to FIGS. 16 to 19.

Figure 16:
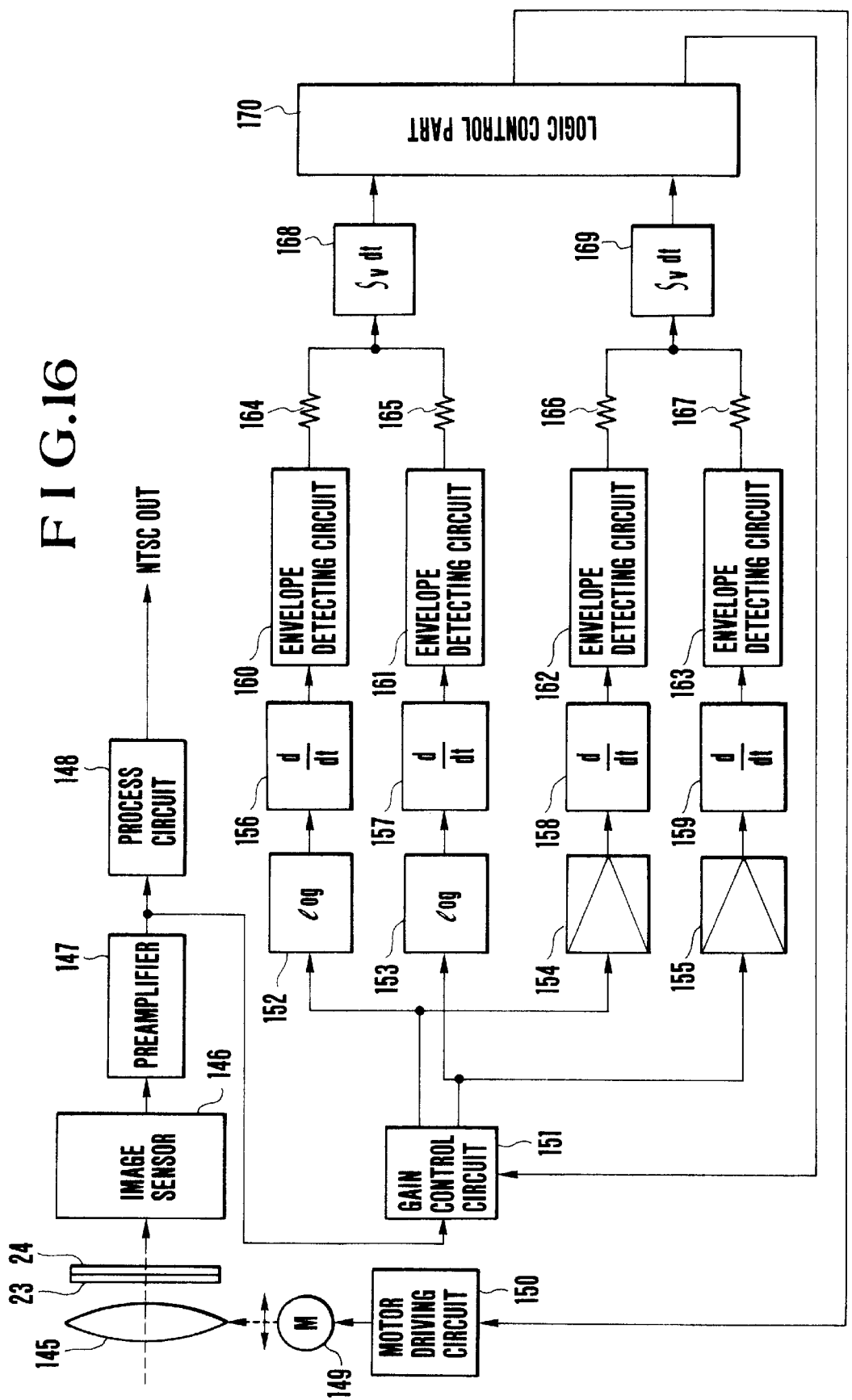
FIG. 16 is a schematic block diagram showing the arrangement of an in-focus detecting apparatus according to a sixth embodiment of the present invention.

FIG. 16 is a schematic block diagram showing the arrangement of a focus detecting system according to a sixth embodiment of the present invention. The arrangement shown in FIG. 16 includes an image sensing lens 145 which constitutes an optical system, an image sensor 146 for converting a subject image projected by the image sensing lens 145 into an electrical signal, a preamplifier 147 for amplifying the output of the image sensor 146 to a suitable level, a process circuit 148 for converting the output of the preamplifier 147 into a standardized signal such as an NTSC television signal, a motor 149 for driving the image sensing lens 145, a motor driving circuit 150 for driving the motor 149 on the basis of an driving information output from a logic control part which will be described later, a gain control circuit 151 for providing two outputs according to different gains from the output of the preamplifier 147, logarithmic amplifiers 152 and 153, linear amplifiers 154 and 155, differentiating circuits 156, 157, 158 and 159, a first envelope detecting circuit 160 for obtaining a "+" directional envelope component of the output of the first differentiating circuit 156, a second envelope detecting circuit 161 for obtaining a "−" directional envelope component of the output of the second differentiating circuit 157, a third envelope detecting circuit 162 for obtaining a "+" directional envelope component of the output of the third differentiating circuit 158, a fourth envelope detecting circuit 163 for obtaining a "−" directional envelope component of the output of the fourth differentiating circuit 159, first and second resistors 164 and 165 for adding together the outputs of the first and second envelope detecting circuits 160 and 161, third and fourth resistors 166 and 167 for adding together the outputs of the third and fourth envelope detecting circuits 162 and 163, a first integrating circuit ($\int_v dt$) 168 for integrating the envelope detection outputs added together by the first and second resistors 164 and 165 at intervals of one picture (field) period, a second integrating circuit ($\int_v dt$) 169 for integrating the envelope detection outputs added together by the third and fourth resistors 166 and 167 at intervals of one picture period, and a logic control part 170 for making a decision as to the state of focus of a subject image projected on an image sensing plane of the image sensor 146 on the basis of the outputs of the first and second integrating circuits 168 and 169 and determining the direction of driving of the motor 149.

The operation of the focus detecting system having the above-described arrangement will be described below.

A subject image projected on the image sensing plane of the image sensor 146 by the image sensing lens 145 which constitutes the optical system is converted into an electrical signal by the image sensor 131, thus preparing a video signal. The video signal is amplified to a suitable level by the preamplifier 147, and the output of the preamplifier 147 is applied to the gain control circuit 151. The gain control circuit 151 provides two outputs which have been amplified to suitable levels, respectively.

One of the outputs of the gain control circuit 151 is amplified by the first logarithmic amplifier 152 and the first linear amplifier 154 on the basis of their respective characteristics. The other output of the gain control circuit 151 is similarly amplified by the second logarithmic amplifier 153 and the second linear amplifier 155.

Figure 17A:
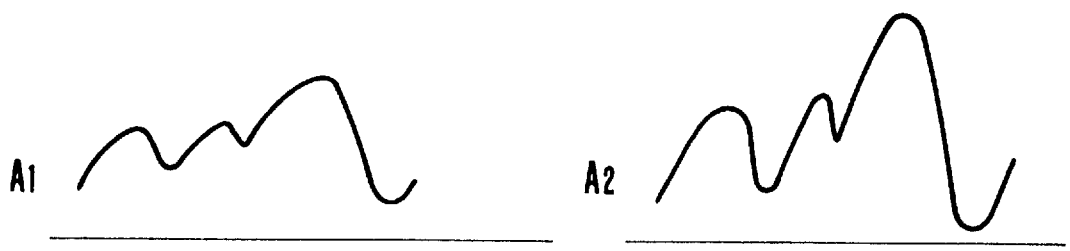
FIGS. 17A, 17B, 17C and 17D are views showing input and output waveforms in the apparatus.

The waveforms A1 and A2 shown in FIG. 17A, are examples of the output waveforms of the first linear amplifier 154 and the second linear amplifier 155, respectively. When the waveforms A1 and A2 are respectively differentiated by the third differentiating circuit 158 and the fourth differentiating circuit 159, the waveforms shown in Parts B1 and B2 are obtained, respectively.

Figure 17B:
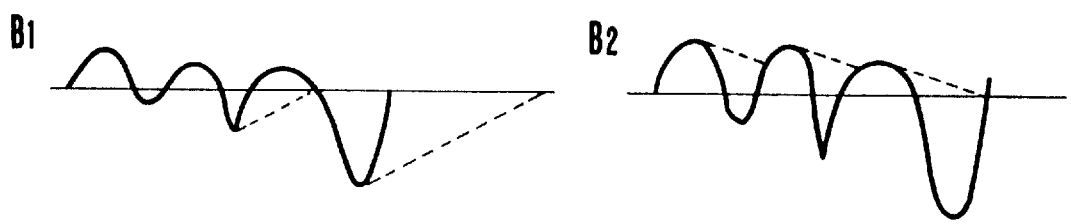
Figure 17C:
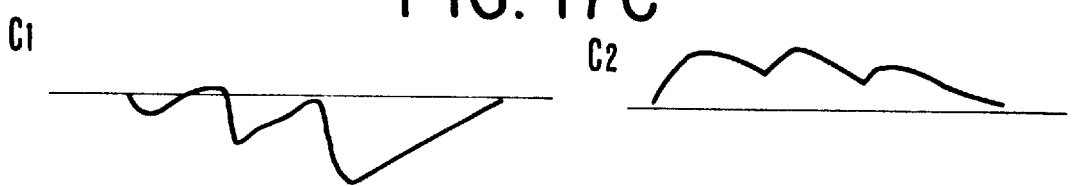
Figure 18:
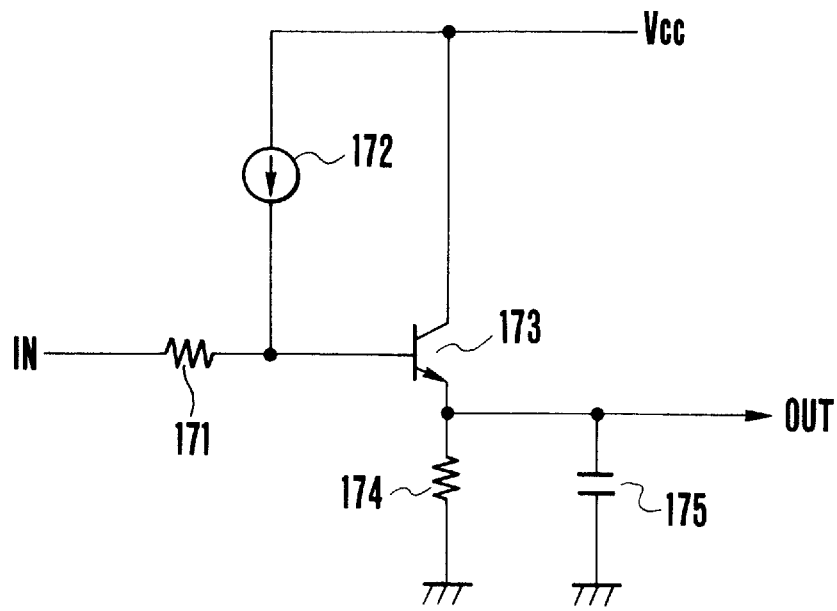
FIG. 18 is a diagram of the arrangement of each of first and third envelope detecting circuits in the apparatus.

Each of the first and third envelope detecting circuits 160 and 162 shown in FIG. 16 is a circuit for obtaining a "+" directional envelope component of an input waveform. FIG. 18 shows one example of such a circuit. In the example shown in FIG. 18, a suitable "+" DC bias is applied to an NPN transistor 173 by a first resistor 171 and a current source 172, and a slope waveform of an envelope component is obtained by a second resistor 174 and a capacitor 175. For example, if the waveform B2 of FIG. 17B is inputted, the waveform shown in Part C2 of FIG. 17C is outputted.

Figure 19:
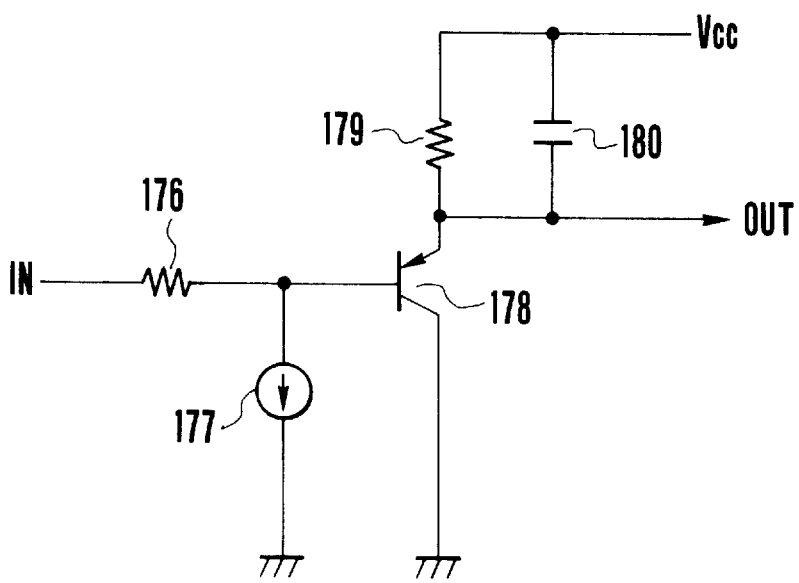
FIG. 19 is a diagram of the arrangement of each of second and fourth envelope detecting circuits in the apparatus.

Each of the second and fourth envelope detecting circuits 161 and 163 shown in FIG. 16 is a circuit for obtaining a "−" directional envelope component of an input waveform. FIG. 19 shows one example of such a circuit. In the example shown in FIG. 19, a suitable "−" DC bias is applied to a PNP transistor 178 by a first resistor 176 and a current source 177, and a slope waveform of an envelope component is obtained by a second resistor 179 and a capacitor 180. For example, if the waveform B1 of FIG. 17B is inputted, the waveform shown in Part C1 of FIG. 17C is outputted. The outputs of the third and fourth envelope detecting circuits 162 and 163 are added together by the third and fourth resistors 166 and 167 shown in FIG. 16, thereby providing the waveform shown in Part D of FIG. 17C.

Figure 17D:
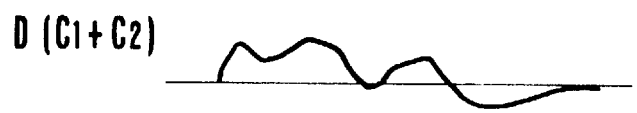

The waveforms, shown in Parts C2 and C1 of FIG. 17D, obtained from the third and fourth envelope detecting circuits 162 and 163 represent, respectively, the absolute amounts of the rising- and falling-edge components of the input video signal waveform. The waveform, shown in Part D of FIG. 17D, obtained by addition through the third and fourth resistors 166 and 167 of FIG. 16 is a waveform based on the difference between the rising-edge component and the falling-edge component.

The output obtained by addition through the third and fourth resistors 166 and 167 of FIG. 16 is integrated by one field period by the second integrating circuit 169, so that the sum of the differences between the rising-edge components and the falling-edge components of one picture is obtained. The logic control part 170 reads the value of the sum and varies the gain of the gain control circuit 151 of FIG. 16 so that the value is made zero.

The rising-edge component and the falling-edge component which are obtained from the first and second linear amplifier 154 and 155 are each influenced not by the state of focus of the image sensing lens 145 which constitutes the optical system, whether near focus or far focus, but by the difference between the rising-edge component and the falling-edge component of the subject image. Accordingly, the gain control circuit 151 is controlled so that the rising-edge component and the falling-edge component of the subject image become equal.

On the other hand, even if the ratio of the output rising- and falling-edge components varies according to the state of focus (near focus and far focus) of the image sensing lens 145 which constitutes the optical system and the rising- and falling-edge components of the subject image itself which do not depend on the near-focus state nor the far-focus state of the image sensing lens 145 are made equal by the logic control part 170, a difference between the rising- and falling-edge components which depend on the state of focus (near focus and far focus) of the image sensing lens 145 remains in the waveforms logarithmically compressed by the first and second logarithmic amplifiers 152 and 153.

Similarly to the outputs of the first and linear amplifiers 154 and 155, the outputs of the first and second logarithmic amplifiers 152 and 153 are respectively converted into differential waveforms by the first and second differentiating circuits 156 and 157. A "+" directional envelope component is obtained from the output of the first differentiating circuit 156 by the first envelope detecting circuit 160, while a "−" directional envelope component is obtained from the output of the second differentiating circuit 157 by the second envelope detecting circuit 161.

The two outputs from the first and second envelope detecting circuits 160 and 161 are added together by the first and second resistors 164 and 165, and the resultant sum is integrated at intervals of one field by the first integrating circuit 168, thereby providing the sum of the differences between the rising-edge components and the falling-edge components of one picture which depend on only the state of focus (near focus and far focus) of the image sensing lens 145.

Similarly to the process of processing the outputs of the first and second linear amplifiers 154 and 155, the above-described process of integrating two envelope detection outputs while performing addition thereof is arranged to integrate rising and falling edges while obtaining the difference therebetween. Accordingly, even if a comparatively large number of rising and falling edges of an input video signal waveform are present within one picture, no comparatively large integral output is provided by integration for one field period of the picture. Accordingly, it is not necessary to expand the output dynamic range of the first integrating circuit 168 nor the input dynamic range of the logic control part 170. Further, the integral value output processed by the first integrating circuit 168 via the first and second envelope detecting circuits 160 and 161 purely depends on the state of focus (near focus and far focus) of the image sensing lens 145. Therefore, on the basis of the result of the integral output, it is possible to determine whether the state of focus of the image sensing lens 145 is near focus or far focus.

The above-described decision is performed by the logic control part 170. The logic control part 170 determines the direction of rotational driving of the image sensing lens 145 on the basis of the obtained information, and transmits a signal for driving the motor 149 to the motor driving circuit 150. In response to this signal, the motor driving circuit 150 supplies a predetermined amount of current to the motor 149, and the motor 149 drives the image sensing lens 145 to bring a subject image into an in-focus state.

In the above-described sixth embodiment, the first and second logarithmic amplifiers 152 and 153 and the first and second linear amplifiers 154 and 155, all of which are shown in FIG. 16, are not limited to specific types of amplifies. The first and second logarithmic amplifiers 152 and 153 only need to have nonlinear characteristics.

The first and second linear amplifiers 154 and 155 may also have linear characteristics different from the above-described ones. For example, the first and second logarithmic amplifiers 152 and 153 may have the γ characteristic shown by the curve "a" in FIG. 9 or the square characteristic shown by the curve "b" in FIG. 9. Similarly, the first and second linear amplifiers 154 and 155 may have the inverse characteristics shown by the curves "c" and "d" in FIG. 9.

As described above in detail, according to the above-described embodiment, the values of differential waveforms before and after the instant when the maximum value of the differential waveform of a video signal is obtained are compared with each other to perform in-focus detection. Accordingly, it is possible to ensure a comparatively high detection accuracy even in the case of a subject of low illuminance and low contrast. Further, even in the case of a subject containing only a rising-edge component or a falling-edge component, it is possible to effect in-focus detection with an accuracy similar to the accuracy of in-focus detection of a general subject.

Further, in the aforesaid signal processing for processing the rising- and falling-edge components of a video signal waveform, a "+" directional envelope component and a "−" directional envelope component are respectively obtained from the rising- and falling-edge components, and only the difference between the rising- and falling-edge components is integrated by integrating both the envelope components while performing addition thereof. Thus, the pure difference between the rising- and falling-edge components for one field period is outputted. Accordingly, it is possible to detect the state of focus (near focus and far focus) of the optical system with a high accuracy, and it is also possible to utilize an integrating circuit having a small output dynamic range and a logic control part having a small input dynamic range for processing the output value of the integrating circuit.

What is claimed is:

1. An image sensing apparatus for converting a subject image formed by an image sensing optical system into a video signal by means of an image sensor, comprising:

diaphragm means provided for use with the image sensing optical system, said diaphragm means having an aperture of a shape which is substantially asymmetrical in a horizontal or vertical direction;

focus detecting means for detecting a near-focus state, a far-focus state and an in-focus state of said image sensing optical system without moving the image sensing optical system on the basis of a waveform of the video signal which corresponds to an edge of the subject image effected by the shape of said diaphragm means being substantially asymmetrical in a horizontal or vertical direction; and driving means for driving the image sensing optical system in a direction in which the image sensing optical system is brought into focus, on the basis of an output of said focus detecting means.

2. An image sensing apparatus according to claim 1, wherein said diaphragm means includes a neutral density filter.

3. An image sensing apparatus according to claim 1, wherein said focus detecting means detects the near-focus state, the far-focus state and the in-focus state on the basis of images corresponding to a rising portion and a falling portion of the edge of the subject image.

4. An image sensing apparatus according to claim 1, wherein said focus detecting means includes:
   a) a gain control circuit for receiving the video signal obtained from the image sensor and outputting first and second output signals which are gain-controlled by a control signal so that their gains differ from each other;
   b) a first amplifier for nonlinearly amplifying the first output signal of said gain control circuit;
   c) a second amplifier for amplifying the first output signal of said gain control circuit linearly or nonlinearly according to a nonlinear characteristic different from a nonlinear characteristic of said first amplifier;
   d) a third amplifier for nonlinearly amplifying the second output signal of said gain control circuit;
   e) a fourth amplifier for amplifying the second output signal of said gain control circuit linearly or nonlinearly according to a nonlinear characteristic different from a nonlinear characteristic of said third amplifier;
   f) control signal generating means for detecting a waveform component of a rising edge of the video signal from an output signal of said second amplifier and also a waveform component of a falling edge of the video signal from an output signal of said fourth amplifier, generating the control signal for causing both levels of the waveform components to become equal to each other, and supplying the control signal to said gain control circuit; and
   g) decision means for detecting a waveform component of a rising edge of the video signal from an output signal of said first amplifier and also a waveform component of a falling edge of the video signal from an output signal of said third amplifier, comparing the waveform components with each other, and making a decision as to the near-focus state, the far-focus state and the in-focus state.

5. An image sensing apparatus according to claim 1, wherein said focus detecting means includes:
   a) a gain control circuit for receiving the video signal obtained from the image sensor and outputting first and second output signals which are gain-controlled by a control signal so that their gains differ from each other;
   b) a first selecting switch for selecting and outputting one signal from the first and second output signals of said gain control circuit in synchronism with a horizontal scanning of the video signal;
   c) a first amplifier for nonlinearly amplifying the output of said first selecting switch;
   d) a second amplifier for amplifying the output of said first selecting switch linearly or nonlinearly according to a nonlinear characteristic different from a nonlinear characteristic of said first amplifier;
   e) a second selecting switch for selecting and outputting one signal from an output signal of said first amplifier and an output signal of said second amplifier in synchronism with the horizontal scanning of the video signal;
   f) control signal generating means for detecting a waveform component of a rising edge of the video signal from the output signal of said second amplifier when said first selecting switch selects the first output signal of said gain control circuit and said second selecting switch selects the output signal of said second amplifier, and also detecting a waveform component of a falling edge of the video signal from the output signal of said second amplifier when said first selecting switch selects the second output signal of said gain control circuit and said second selecting switch selects the output signal of said second amplifier, generating the control signal for causing both levels of the waveform components to become equal to each other, and supplying the control signal to said gain control circuit; and
   g) decision means for detecting a waveform component of a rising edge of the video signal from the output signal of said first amplifier when said first selecting switch selects the first output signal of said gain control circuit and said second selecting switch selects the output signal of said first amplifier, and also detecting a waveform component of a falling edge of the video signal from the output signal of said first amplifier when said first selecting switch selects the second output signal of said gain control circuit and said second selecting switch selects the output signal of said first amplifier, comparing the waveform components with each other, and making a decision as to the near-focus state, the far-focus state and the in-focus state.

6. An image sensing apparatus according to claim 1, further comprising an image pickup element, the scanning direction of said element being the asymmetrical direction of the shape of the diaphragm.

7. An image sensing apparatus according to claim 6, wherein the asymmetrical direction is horizontal.

8. An image sensing apparatus, comprising:
   image sensing means for converting an image formed by an optical system into an image signal;
   aperture means having an aperture which is substantially asymmetrical in a predetermined direction;
   focus detecting means for detecting a focus state without moving said optical system and deciding a driving direction of said optical system on the basis of a waveform of the image signal corresponding to an edge of the image effected by the shape of said aperture means being substantially asymmetrical in the predetermined direction; and
   driving means for driving said optical system in the driving direction decided by said focus detecting means.

9. An image sensing apparatus according to claim 8, wherein the asymmetrical direction of the aperture means is the scanning direction of the image sensing means.

10. An image sensing apparatus according to claim 9, wherein the asymmetrical portions of the aperture have different light transmissivity.

11. An image sensing apparatus according to claim 10, wherein a neutral density filter is attached to half of the aperture.

12. An image sensing apparatus according to claim 8, wherein said focus detecting means detects the near-focus state, the far-focus state and the in-focus state on the basis of images corresponding to a rising portion and a falling portion of the edge of the image.

13. An image sensing apparatus according to claim 8, wherein said focus detecting means includes:
   a) a gain control circuit for receiving the image signal obtained from an image sensor and outputting first and second output signals which are gain-controlled by a control signal so that their gains differ from each other;
   b) a first amplifier for nonlinearly amplifying the first output signal of said gain control circuit;
   c) a second amplifier for amplifying the first output signal of said gain control circuit linearly or nonlinearly according to a nonlinear characteristic different from a nonlinear characteristic of said first amplifier;

d) a third amplifier for nonlinearly amplifying the second output signal of said gain control circuit;

e) a fourth amplifier for amplifying the second output signal of said gain control circuit linearly or nonlinearly according to a nonlinear characteristic different from a nonlinear characteristic of said third amplifier;

f) control signal generating means for detecting a waveform component of a rising edge of the image signal from an output signal of said second amplifier and also a waveform component of a falling edge of the image signal from an output signal of said fourth amplifier, generating the control signal for causing both levels of the waveform components to become equal to each other, and supplying the control signal to said gain control circuit; and g) decision means for detecting a waveform component of a rising edge of the image signal from an output signal of said first amplifier and also a waveform component of a falling edge of the image signal from an output signal of said third amplifier, comparing the waveform components with each other, and making a decision as to the near-focus state, the far-focus state and the in-focus state.

14. An image sensing apparatus according to claim 8, wherein said focus detecting means includes:

a) a gain control circuit for receiving the image signal obtained from an image sensor and outputting first and second output signals which are gain-controlled by a control signal so that their gains differ from each other;

b) a first selecting switch for selecting and outputting one signal from the first and second output signals of said gain control circuit in synchronism with a horizontal scanning of the image signal;

c) a first amplifier for nonlinearly amplifying the output of said first selecting switch;

d) a second amplifier for amplifying the output of said first selecting switch linearly or nonlinearly according to a nonlinear characteristic different from a nonlinear characteristic of said first amplifier;

e) a second selecting switch for selecting and outputting one signal from an output signal of said first amplifier and an output signal of said second amplifier in synchronism with the horizontal scanning of the image signal;

f) control signal generating means for detecting a waveform component of a rising edge of the image signal from tile output signal of said second amplifier when said first selecting switch selects the first output signal of said gain control circuit and said second selecting switch selects the output signal of said second amplifier, and also detecting a waveform component of a falling edge of the image signal from the output signal of said second amplifier when said first selecting switch selects the second output signal of said gain control circuit and said second selecting switch selects the output signal of said second amplifier, generating the control signal for causing both levels of the waveform components to become equal to each other, and supplying the control signal to said gain control circuit; and g) decision means for detecting a waveform component of a rising edge of the image signal from the output signal of said first amplifier when said first selecting switch selects the first output signal of said gain control circuit and said second selecting switch selects the output signal of said first amplifier, and also detecting a waveform component of a falling edge of the image signal from the output signal of said first amplifier when said first selecting switch selects the second output signal of said gain control circuit and said second selecting switch selects the output signal of said first amplifier, comparing the waveform components with each other, and making a decision as to the near-focus state, the far-focus state and the in-focus state.

* * * * *